United States Patent
Xu et al.

(10) Patent No.: US 12,468,443 B2
(45) Date of Patent: Nov. 11, 2025

(54) METHOD AND APPARATUS FOR PROCESSING DATA, REDUCTION SERVER, AND MAPPING SERVER

(71) Applicant: HUAWEI TECHNOLOGIES CO., LTD., Guangdong (CN)

(72) Inventors: Hua Xu, Hangzhou (CN); Xiaoming Bao, Beijing (CN); Hongwei Sun, Beijing (CN); Yihai Zheng, Shenzhen (CN); Chun Liu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 109 days.

(21) Appl. No.: 18/485,847

(22) Filed: Oct. 12, 2023

(65) Prior Publication Data

US 2024/0036728 A1    Feb. 1, 2024

Related U.S. Application Data

(63) Continuation of application No. PCT/CN2022/085771, filed on Apr. 8, 2022.

(30) Foreign Application Priority Data

Apr. 14, 2021 (CN) .......................... 202110401463.9
Jun. 8, 2021 (CN) .......................... 202110638812.9
Jul. 19, 2021 (CN) .......................... 202110812926.0

(51) Int. Cl.
*G06F 3/06*        (2006.01)
*G06F 12/02*      (2006.01)

(52) U.S. Cl.
CPC ............ *G06F 3/0608* (2013.01); *G06F 3/064* (2013.01); *G06F 3/0644* (2013.01); *G06F 3/067* (2013.01); *G06F 12/0223* (2013.01)

(58) Field of Classification Search
None
See application file for complete search history.

(56) References Cited

U.S. PATENT DOCUMENTS 10,642,520 B1 * 5/2020 Zhao ..................... G06F 3/0644
2009/0089537 A1 * 4/2009 Vick ................... G06F 12/0284
711/E12.09

(Continued)

OTHER PUBLICATIONS

Zhang et al. (Accelerating MapReduce with Distributed Memory Cache 2009 IEEE) pp. 472-478 (Year: 2009).*

(Continued)

*Primary Examiner* — Kaushikkumar M Patel
(74) *Attorney, Agent, or Firm* — Fish & Richardson P.C.

(57) ABSTRACT

Methods and apparatuses for processing data are provided. In an implementation, a method comprising: obtaining, by a reduction server of a plurality of reduction servers in a distributed processing system and from a first storage area, metadata of first data to be read, wherein the first data comprises a target data block in a plurality of data blocks of second data, and wherein the second data comprises a processing result of a mapping server of a plurality of mapping servers for input data, determining a first address of the first data in a global memory based on the metadata, wherein the global memory comprises memories of the plurality of mapping servers and the plurality of reduction servers, and reading the first data from the global memory based on the first address.

20 Claims, 10 Drawing Sheets

(56) References Cited

U.S. PATENT DOCUMENTS

| | | | |
|---|---|---|---|
| 2014/0055496 A1 | 2/2014 | Cunningham et al. | |
| 2015/0100592 A1* | 4/2015 | Balikov | G06F 16/23 |
| | | | 707/752 |
| 2016/0034205 A1* | 2/2016 | Mehra | G06F 3/061 |
| | | | 711/153 |
| 2017/0149890 A1* | 5/2017 | Shamis | H04L 67/1097 |
| 2020/0210114 A1* | 7/2020 | Hu | G06F 16/2379 |
| 2020/0387364 A1* | 12/2020 | O'Connell | G06F 8/51 |

OTHER PUBLICATIONS

Rabi Prasad Padhy (Big Data Processing with Hadoop-MapReduce in Cloud Systems) pp. 16-27, 2013 (Year: 2013).*

Extended European Search Report in European Appln No. 22787444.3, dated Jan. 31, 2024, 10 pages.

* cited by examiner

-- PRIOR ART --

FIG. 2 -- PRIOR ART --

METHOD AND APPARATUS FOR PROCESSING DATA, REDUCTION SERVER, AND MAPPING SERVER

CROSS-REFERENCE TO RELATED APPLICATIONS

This application is a continuation of International Application No. PCT/CN2022/085771, filed on Apr. 8, 2022, which claims priority to Chinese Patent Application No. 202110812926.0, filed on Jul. 19, 2021, and Chinese Patent Application No. 202110638812.9, filed on Jun. 8, 2021, and Chinese Patent Application No. 202110401463.9, filed on Apr. 14, 2021. All of the aforementioned patent applications are hereby incorporated by reference in their entireties.

TECHNICAL FIELD

This application relates to the field of computer technologies, and in particular, to a method and apparatus for processing data, a reduction server, and a mapping server.

BACKGROUND

In recent years, a digital wave featuring big data, Internet of Things, artificial intelligence, and 5th generation mobile networks (5th generation mobile networks, 5G) is sweeping the world, resulting in massive data.

In a related technology, a distributed high-concurrency computing framework is usually used for processing massive data. Data to be processed is partitioned into several data blocks, and concurrent computing is performed through different computing nodes. An entire data processing process may be partitioned into several steps. When input data of one step is from operation results of a plurality of computing nodes in a previous step, transmission of a large amount of data between computing nodes is inevitably involved. However, due to factors such as a limited memory capacity of a single computing node, a large network transmission delay between computing nodes, and a small bandwidth, data transmission efficiency between computing nodes is relatively low.

SUMMARY

In view of this, a data processing technical solution is provided.

According to a first aspect, an embodiment of this application provides a method for processing data, where the method is applied to a reduction server in a distributed processing system, the distributed processing system includes a plurality of mapping servers and a plurality of reduction servers, and memories of the plurality of mapping servers and memories of the plurality of reduction servers form a global memory; and the method includes: obtaining, from a preset first storage area, metadata of first data to be read; determining a first address of the first data in the global memory based on the metadata; and reading the first data from the global memory based on the first address, where the first data includes a target data block in a plurality of data blocks of second data, and the second data includes a processing result of a corresponding mapping server for input data.

According to this embodiment of this application, the reduction server in the distributed processing system can obtain, from the first storage area, the metadata of the first data to be read, where the first data includes the target data block in the plurality of data blocks of the second data, and the second data includes the processing result of the corresponding mapping server for the input data. The reduction server then determines the first address of the first data in the global memory based on the metadata, and reads the first data from the global memory based on the first address. Therefore, when the reduction server reads the input data (the first data) including the target data block from the processing results of the plurality of mapping servers, the reduction server does not need to copy and transmit the target data block. Instead, the reduction server directly reads, in a memory manner, the target data block that is stored in the global memory. In this way, a processing process in the shuffle phase is not limited by factors such as a memory capacity of a computing node, physical bandwidth of a transmission network, a transmission delay, and the like. In addition, processing efficiency and processing performance in the shuffle phase can be improved, thereby improving processing efficiency of the distributed processing system.

According to the first aspect, in a first possible implementation of the method for processing data, the reading the first data from the global memory based on the first address includes: mapping the first address to a second address when the first address is outside an access range of the reduction server, where the second address is within the access range of the reduction server; and reading the first data from the global memory based on the second address.

In this embodiment, address mapping is performed when the first address is outside the access range of the reduction server, so that the reduction server can read the first data remotely from the global memory.

According to the first aspect or the first possible implementation of the first aspect, in a second possible implementation of the method for processing data, the method further includes: The reduction server performs registration by using a preset register instruction after the reduction server is connected to the distributed processing system, so that the memory of the reduction server is added to the global memory.

In this embodiment, through registration of the reduction server, the memory of the reduction server that is added to the distributed processing system can be managed in a unified manner, thereby implementing management of the global memory.

According to a second aspect, an embodiment of this application provides a method for processing data, where the method is applied to a mapping server in a distributed processing system, the distributed processing system includes a plurality of mapping servers and a plurality of reduction servers, and memories of the plurality of mapping servers and memories of the plurality of reduction servers form a global memory; and the method includes: processing input data to obtain second data; partitioning the second data into a plurality of data blocks based on a preset label; and storing the plurality of data blocks into a second storage area, where the second storage area is located in the global memory.

According to this embodiment of this application, the mapping server in the distributed processing system can process the input data to obtain second data, partition the second data into a plurality of data blocks based on the preset label, and then store the plurality of data blocks into the second storage area that is located in the global memory. Therefore, a processing result (namely, the second data) of the mapping server may be stored in the global memory in a shuffle phase. In this way, slow disk reading/writing can be avoided. In addition, a processing process of the shuffle phase is not limited by a memory capacity of the mapping server, thereby improving processing efficiency and processing performance of the shuffle phase.

According to the second aspect, in a first possible implementation of the method for processing data, the storing the plurality of data blocks into a second storage area includes: partitioning, when data in the plurality of data blocks needs to be sorted, the second storage area into a plurality of sub-areas based on a preset second size; storing the plurality of data blocks into the plurality of sub-areas according to a sequence of the sub-areas; and sorting, when the plurality of data blocks are stored into the plurality of sub-areas in sequence, data in all the sub-areas in which storage has been performed by updating an ordered index linked list, where the ordered index linked list is sorted by linking a location index of data by using a linked list.

In this embodiment, data writing and sorting are performed in an asynchronous pipeline (pipeline) manner, and the ordered index linked list is used during sorting. In this way, sorting can be performed while writing, thereby implementing direct sorting during writing. In addition, a data copy step during separate sorting can be removed, thereby reducing memory occupation and improving processing efficiency of shuffle writing in the shuffle phase. In addition, in this manner, writing and sorting may be further combined into one step, thereby reducing processing steps and improving processing efficiency of the shuffle phase.

According to the second aspect, in a second possible implementation of the method for processing data, the mapping server includes at least one first operator that processes the input data, and the method is implemented by performing a first operation process on the mapping server; and the method further includes: applying, in an initialization phase of the first operation process, to the global memory for the second storage area based on a quantity of processor cores of the mapping server, so that each processor core corresponds to one second storage area, where at least one first operator runs on each processor core.

In this embodiment, the second storage area is applied for, in the initialization phase of the first operation process on the mapping server, to the global memory based on the quantity of the processor cores of the mapping server, so that each processor core corresponds to one second storage area, where at least one first operator runs on each processor core. Therefore, at least one operator that runs on a same processor core can be considered as a shuffle writer, and storage space is allocated to the shuffle writer in the global memory. In this way, data with a same label in the processing result of the at least one operator that runs on the same processor core is stored in a same area of the global memory, so that data aggregation based on the processor core is implemented, data decentralization is reduced, and data reading efficiency is improved.

According to the second aspect, in a third possible implementation of the method for processing data, the partitioning the second data into a plurality of data blocks based on a preset label includes: partitioning, in a hash manner, the second data into a plurality of data blocks based on the preset label.

In this embodiment, the second data is partitioned into a plurality of data blocks in the hash manner, so that sorting does not need to be performed before the second data is partitioned, thereby improving processing efficiency for the second data block.

According to the second aspect, in a fourth possible implementation of the method for processing data, the storing the plurality of data blocks into a second storage area includes: determining a third address of the second storage area; mapping the third address to a fourth address when the third address is outside an access range of the mapping server, where the fourth address is within the access range of the mapping server; and storing the plurality of data blocks into the second storage area based on the fourth address.

In this embodiment, address mapping is performed when the third address is outside the access range of the mapping server, so that the mapping server can access the second storage area located remotely.

According to any one of the second aspect or the first possible implementation of the second aspect to the fourth possible implementation of the second aspect, in a fifth possible implementation of the method for processing data, the method further includes: determining metadata of the plurality of data blocks; and storing the metadata of the plurality of data blocks into a preset first storage area.

In this embodiment, the metadata of the plurality of data blocks is determined, and the metadata is stored into the first storage area. In this way, the reduction server can obtain, from the first storage area, metadata of the data to be read, for example, a label, a storage address, and the like.

According to any one of the second aspect or the first possible implementation of the second aspect to the fifth possible implementation of the second aspect, in a sixth possible implementation of the method for processing data, the method further includes: The mapping server performs registration by using a preset register instruction after the mapping server is connected to the distributed processing system, so that the memory of the mapping server is added to the global memory.

In this embodiment, through registration of the mapping server, the memory of the mapping server that is added to the distributed processing system can be managed in a unified manner, thereby implementing management of the global memory.

According to any one of the second aspect or the first possible implementation of the second aspect to the sixth possible implementation of the second aspect, in a seventh possible implementation of the method for processing data, the method further includes: determining, when a first memory meets a first condition, first target data from data stored in the first memory, and storing the first target data into an external storage area, where the first condition is that used space of the first memory is greater than or equal to a first threshold, or a ratio of the used space of the first memory to total space of the first memory is greater than or equal to a second threshold, and the first memory is the global memory or a part of the global memory.

In this embodiment, a memory management apparatus manages the first memory, so that when storage space of the first memory is insufficient, part of data in the first memory can be stored into the external storage area, to free up space for storing data to be stored. In this way, a case in which the first memory cannot store a large amount of data and an application cannot run normally or has low running efficiency is avoided.

According to any one of the second aspect or the first possible implementation of the second aspect to the seventh possible implementation of the second aspect, in an eighth possible implementation of the method for processing data, the method further includes: determining, when the first memory meets a second condition, second target data from data stored in the external storage area, and storing the second target data in the first memory, where the second condition is that the used space of the first memory is less than or equal to a third threshold, or the ratio of the used space of the first memory to the total space of the first memory is less than or equal to a fourth threshold.

In this embodiment, the memory management apparatus manages the first memory, so that when available storage space of the first memory becomes larger, the data stored into the external storage area can be retrieved and stored into the first memory. In this way, a reduction server that needs to read this part of data can read the corresponding data from the global memory instead of reading the data from the external storage area, thereby improving data reading efficiency.

According to the second aspect, the seventh possible implementation of the second aspect, or the eighth possible implementation of the second aspect, in a ninth possible implementation of the method for processing data, the external storage area includes at least one of the following: a hard disk drive (hard disk drive, HDD) and a solid state disk (solid state disk, SSD).

In this embodiment, the external storage area includes the HDD and/or the SSD, and can persistently store the data.

According to a third aspect, an embodiment of this application provides a reduction server, where the reduction server is used in a distributed processing system, the distributed processing system includes a plurality of mapping servers and a plurality of reduction servers, and memories of the plurality of mapping servers and memories of the plurality of reduction servers form a global memory; and the reduction server includes: a metadata reading module, configured to obtain, from a preset first storage area, metadata of first data to be read; an address determining module, configured to determine a first address of the first data in the global memory based on the metadata; and a data reading module, configured to read the first data from the global memory based on the first address, where the first data includes a target data block in a plurality of data blocks of second data, and the second data includes a processing result of a corresponding mapping server for input data.

According to this embodiment of this application, the reduction server in the distributed processing system can obtain, from the first storage area, the metadata of the first data to be read, where the first data includes the target data block in the plurality of data blocks of the second data, and the second data includes the processing result of the corresponding mapping server for the input data. The reduction server then determines the first address of the first data in the global memory based on the metadata, and reads the first data from the global memory based on the first address. Therefore, when the reduction server reads the input data (the first data) including the target data block from the processing results of the plurality of mapping servers, the reduction server does not need to copy and transmit the target data block. Instead, the reduction server directly reads, in a memory manner, the target data block that is stored in the global memory. In this way, a processing process in the shuffle phase is not limited by factors such as a memory capacity of a computing node, physical bandwidth of a transmission network, a transmission delay, and the like. In addition, processing efficiency and processing performance in the shuffle phase can be improved, thereby improving processing efficiency of the distributed processing system.

According to the third aspect, in a first possible implementation of the reduction server, the data reading module is configured to: map the first address to a second address when the first address is outside an access range of the reduction server, where the second address is within the access range of the reduction server; and read the first data from the global memory based on the second address.

In this embodiment, address mapping is performed when the first address is outside the access range of the reduction server, so that the reduction server can read the first data remotely from the global memory.

According to the third aspect or the first possible implementation of the third aspect, in a second possible implementation of the reduction server, the reduction server further includes: a first registration module, configured to perform, by the reduction server, registration by using a preset register instruction after the reduction server is connected to the distributed processing system, so that the memory of the reduction server is added to the global memory.

In this embodiment, through registration of the reduction server, the memory of the reduction server that is added to the distributed processing system can be managed in a unified manner, thereby implementing management of the global memory.

According to a fourth aspect, an embodiment of this application provides a mapping server, where the mapping server is used in a distributed processing system, the distributed processing system includes a plurality of mapping servers and a plurality of reduction servers, and memories of the plurality of mapping servers and memories of the plurality of reduction servers form a global memory; and the mapping server includes: a data processing module, configured to process input data to obtain second data; a data partitioning module, configured to partition the second data into a plurality of data blocks based on a preset label; and a data storage module, configured to store the plurality of data blocks into a second storage area, where the second storage area is located in the global memory.

According to this embodiment of this application, the mapping server in the distributed processing system can process the input data to obtain second data, partition the second data into a plurality of data blocks based on the preset label, and then store the plurality of data blocks into the second storage area that is located in the global memory. Therefore, a processing result (namely, the second data) of the mapping server may be stored in the global memory in a shuffle phase. In this way, slow disk reading/writing can be avoided. In addition, a processing process of the shuffle phase is not limited by a memory capacity of the mapping server, thereby improving processing efficiency and processing performance of the shuffle phase.

According to the fourth aspect, in a first possible implementation of the mapping server, the data storage module is configured to: partition, when data in the plurality of data blocks needs to be sorted, the second storage area into a plurality of sub-areas based on a preset second size; store the plurality of data blocks into the plurality of sub-areas according to a sequence of the sub-areas; and sort, when the plurality of data blocks are stored into the plurality of sub-areas in sequence, data in all the sub-areas in which storage has been performed by updating an ordered index linked list, where the ordered index linked list is sorted by linking a location index of data by using a linked list.

In this embodiment, data writing and sorting are performed in an asynchronous pipeline (pipeline) manner, and the ordered index linked list is used during sorting. In this way, sorting can be performed while writing, thereby implementing direct sorting during writing. In addition, a data copy step during separate sorting can be removed, thereby reducing memory occupation and improving processing efficiency of shuffle writing in the shuffle phase. In addition, in this manner, writing and sorting may be further combined into one step, thereby reducing processing steps and improving processing efficiency of the shuffle phase.

According to the fourth aspect, in a second possible implementation of the mapping server, the mapping server further includes: an initialization module, configured to apply, in an initialization phase of a first operation process, to the global memory for the second storage area based on a quantity of processor cores of the mapping server, so that each processor core corresponds to one second storage area, where the first operation process runs on the mapping server and is used to process the input data, at least one first operator runs on each processor core, and the first operator is configured to process the input data.

In this embodiment, the second storage area is applied for, in the initialization phase of the first operation process on the mapping server, to the global memory based on the quantity of the processor cores of the mapping server, so that each processor core corresponds to one second storage area, where at least one first operator runs on each processor core. Therefore, at least one operator that runs on a same processor core can be considered as a shuffle writer, and storage space is allocated to the shuffle writer in the global memory. In this way, data with a same label in the processing result of the at least one operator that runs on the same processor core is stored in a same area of the global memory, so that data aggregation based on the processor core is implemented, data decentralization is reduced, and data reading efficiency is improved.

According to the fourth aspect, in a third possible implementation of the mapping server, the data partitioning module is configured to partition, in a hash manner, the second data into a plurality of data blocks based on the preset label.

In this embodiment, the second data is partitioned into a plurality of data blocks in the hash manner, so that sorting does not need to be performed before the second data is partitioned, thereby improving processing efficiency for the second data block.

According to the fourth aspect, in a fourth possible implementation of the mapping server, the data storage module is configured to: determine a third address of the second storage area; map the third address to a fourth address when the third address is outside an access range of the mapping server, where the fourth address is within the access range of the mapping server; and store the plurality of data blocks into the second storage area based on the fourth address.

In this embodiment, address mapping is performed when the third address is outside the access range of the mapping server, so that the mapping server can access the second storage area located remotely.

According to any one of the fourth aspect or the first possible implementation of the fourth aspect to the fourth possible implementation of the fourth aspect, in a fifth possible implementation of the mapping server, the mapping server further includes: a metadata determining module, configured to determine metadata of the plurality of data blocks; and a metadata storage module, configured to store the metadata of the plurality of data blocks into a preset first storage area.

In this embodiment, the metadata of the plurality of data blocks is determined, and the metadata is stored into the first storage area. In this way, the reduction server can obtain, from the first storage area, metadata of the data to be read, for example, a label, a storage address, and the like.

According to any one of the fourth aspect or the first possible implementation of the fourth aspect to the fifth possible implementation of the fourth aspect, in a sixth possible implementation of the mapping server, the mapping server further includes: a second registering module, configured to perform, by the mapping server, registration by using a preset register instruction after the mapping server is connected to the distributed processing system, so that the memory of the mapping server is added to the global memory.

In this embodiment, through registration of the mapping server, the memory of the mapping server that is added to the distributed processing system can be managed in a unified manner, thereby implementing management of the global memory.

According to any one of the fourth aspect or the first possible implementation of the fourth aspect to the sixth possible implementation of the fourth aspect, in a seventh possible implementation of the method for processing data, the mapping server further includes: a memory management apparatus, configured to determine, when a first memory meets a first condition, first target data from data stored in the first memory, and store the first target data into an external storage area, where the first condition is that used space of the first memory is greater than or equal to a first threshold, or a ratio of the used space of the first memory to total space of the first memory is greater than or equal to a second threshold, and the first memory is the global memory or a part of the global memory.

In this embodiment, a memory management apparatus manages the first memory, so that when storage space of the first memory is insufficient, part of data in the first memory can be stored into the external storage area, to free up space for storing data to be stored. In this way, a case in which the first memory cannot store a large amount of data and an application cannot run normally or has low running efficiency is avoided.

According to any one of the fourth aspect or the first possible implementation of the fourth aspect to the seventh possible implementation of the fourth aspect, in an eighth possible implementation of the method for processing data, the memory management apparatus is further configured to: determining, when the first memory meets a second condition, second target data from data stored in the external storage area, and storing the second target data in the first memory, where the second condition is that the used space of the first memory is less than or equal to a third threshold, or the ratio of the used space of the first memory to the total space of the first memory is less than or equal to a fourth threshold.

In this embodiment, the memory management apparatus manages the first memory, so that when available storage space of the first memory becomes larger, the data stored into the external storage area can be retrieved and stored into the first memory. In this way, a reduction server that needs to read this part of data can read the corresponding data from the global memory instead of reading the data from the external storage area, thereby improving data reading efficiency.

According to the fourth aspect or the seventh possible implementation of the fourth aspect or the eighth possible implementation of the fourth aspect, in a ninth possible implementation of the method for processing data, the external storage area includes at least one of the following: an HDD and an SSD.

In this embodiment, the external storage area includes the HDD and/or the SSD, and can persistently store the data.

According to a fifth aspect, an embodiment of this application provides an apparatus for processing data, including a processor and a memory configured to store instructions executable by the processor. When executing the instructions, the processor is configured to implement the method for processing data in one or more of the first aspect or the possible implementations of the first aspect, or implement the method for processing data in one or more of the second aspect or the possible implementations of the second aspect.

According to this embodiment of this application, the mapping server in the distributed processing system can process the input data to obtain second data, partition the second data into a plurality of data blocks based on the preset label, and then store the plurality of data blocks into the second storage area that is located in the global memory. Therefore, a processing result (namely, the second data) of the mapping server may be stored in the global memory in a shuffle phase. In this way, slow disk reading/writing can be avoided. In addition, a processing process of the shuffle phase is not limited by a memory capacity of the mapping server, thereby improving processing efficiency and processing performance of the shuffle phase.

The reduction server in the distributed processing system can obtain, from the first storage area, the metadata of the first data to be read, where the first data includes the target data block in the plurality of data blocks of the second data, and the second data includes the processing result of the corresponding mapping server for the input data. The reduction server then determines the first address of the first data in the global memory based on the metadata, and reads the first data from the global memory based on the first address. Therefore, when the reduction server reads the input data (the first data) including the target data block from the processing results of the plurality of mapping servers, the reduction server does not need to copy and transmit the target data block. Instead, the reduction server directly reads, in a memory manner, the target data block that is stored in the global memory. In this way, a processing process in the shuffle phase is not limited by factors such as a memory capacity of a computing node, physical bandwidth of a transmission network, a transmission delay, and the like. In addition, processing efficiency and processing performance in the shuffle phase can be improved, thereby improving processing efficiency of the distributed processing system.

According to a sixth aspect, an embodiment of this application provides a non-volatile computer-readable storage medium, where the non-volatile computer-readable storage medium stores computer program instructions. When the computer program instructions are executed by a processor, the method for processing data in one or more of the first aspect or the possible implementations of the first aspect is implemented, or the method for processing data in one or more of the second aspect or the possible implementations of the second aspect is implemented.

According to this embodiment of this application, the mapping server in the distributed processing system can process the input data to obtain second data, partition the second data into a plurality of data blocks based on the preset label, and then store the plurality of data blocks into the second storage area that is located in the global memory. Therefore, a processing result (namely, the second data) of the mapping server may be stored in the global memory in a shuffle phase. In this way, slow disk reading/writing can be avoided. In addition, a processing process of the shuffle phase is not limited by a memory capacity of the mapping server, thereby improving processing efficiency and processing performance of the shuffle phase.

The reduction server in the distributed processing system can obtain, from the first storage area, the metadata of the first data to be read, where the first data includes the target data block in the plurality of data blocks of the second data, and the second data includes the processing result of the corresponding mapping server for the input data. The reduction server then determines the first address of the first data in the global memory based on the metadata, and reads the first data from the global memory based on the first address. Therefore, when the reduction server reads the input data (the first data) including the target data block from the processing results of the plurality of mapping servers, the reduction server does not need to copy and transmit the target data block. Instead, the reduction server directly reads, in a memory manner, the target data block that is stored in the global memory. In this way, a processing process in the shuffle phase is not limited by factors such as a memory capacity of a computing node, physical bandwidth of a transmission network, a transmission delay, and the like. In addition, processing efficiency and processing performance in the shuffle phase can be improved, thereby improving processing efficiency of the distributed processing system.

According to a seventh aspect, an embodiment of this application provides a computer program product, including computer-readable code or a non-volatile computer-readable storage medium carrying computer-readable code. When the computer-readable code runs on an electronic device, a processor in the electronic device performs the method for processing data in one or more of the first aspect or the possible implementations of the first aspect, or performs the method for processing data in one or more of the second aspect or the possible implementations of the second aspect.

According to this embodiment of this application, the mapping server in the distributed processing system can process the input data to obtain second data, partition the second data into a plurality of data blocks based on the preset label, and then store the plurality of data blocks into the second storage area that is located in the global memory. Therefore, a processing result (namely, the second data) of the mapping server may be stored in the global memory in a shuffle phase. In this way, slow disk reading/writing can be avoided. In addition, a processing process of the shuffle phase is not limited by a memory capacity of the mapping server, thereby improving processing efficiency and processing performance of the shuffle phase.

The reduction server in the distributed processing system can obtain, from the first storage area, the metadata of the first data to be read, where the first data includes the target data block in the plurality of data blocks of the second data, and the second data includes the processing result of the corresponding mapping server for the input data. The reduction server then determines the first address of the first data in the global memory based on the metadata, and reads the first data from the global memory based on the first address. Therefore, when the reduction server reads the input data (the first data) including the target data block from the processing results of the plurality of mapping servers, the reduction server does not need to copy and transmit the target data block. Instead, the reduction server directly reads, in a memory manner, the target data block that is stored in the global memory. In this way, a processing process in the shuffle phase is not limited by factors such as a memory capacity of a computing node, physical bandwidth of a transmission network, a transmission delay, and the like. In addition, processing efficiency and processing performance in the shuffle phase can be improved, thereby improving processing efficiency of the distributed processing system.

These aspects and other aspects of this application are more concise and more comprehensive in descriptions of the following (a plurality of) embodiments.

BRIEF DESCRIPTION OF DRAWINGS

The accompanying drawings included in this specification and constituting a part of this specification and this specification jointly show example embodiments, features, and aspects of this application, and are intended to explain the principles of this application.

DESCRIPTION OF EMBODIMENTS

The following describes various example embodiments, features, and aspects of this application in detail with reference to the accompanying drawings. Identical reference signs in the accompanying drawings indicate elements that have same or similar functions. Although various aspects of embodiments are illustrated in the accompanying drawing, the accompanying drawings are not necessarily drawn in proportion unless otherwise specified.

The specific term "example" herein means "used as an example, embodiment or illustration". Any embodiment described as "an example" is not necessarily explained as being superior or better than other embodiments.

In addition, to better describe this application, numerous specific details are given in the following specific implementations. A person skilled in the art should understand that this application can also be implemented without some specific details. In some instances, methods, means, elements and circuits that are well-known to a person skilled in the art are not described in detail, so that the subject matter of this application is highlighted.

Currently, a distributed high-concurrency computing framework is usually used to process and analyze massive data, such as hadoop map-reduce (hadoop map-reduce, HadoopMR) framework and Spark. The distributed high-concurrency computing framework uses a plurality of computing nodes to perform concurrent computing on data to be processed.

Figure 1:
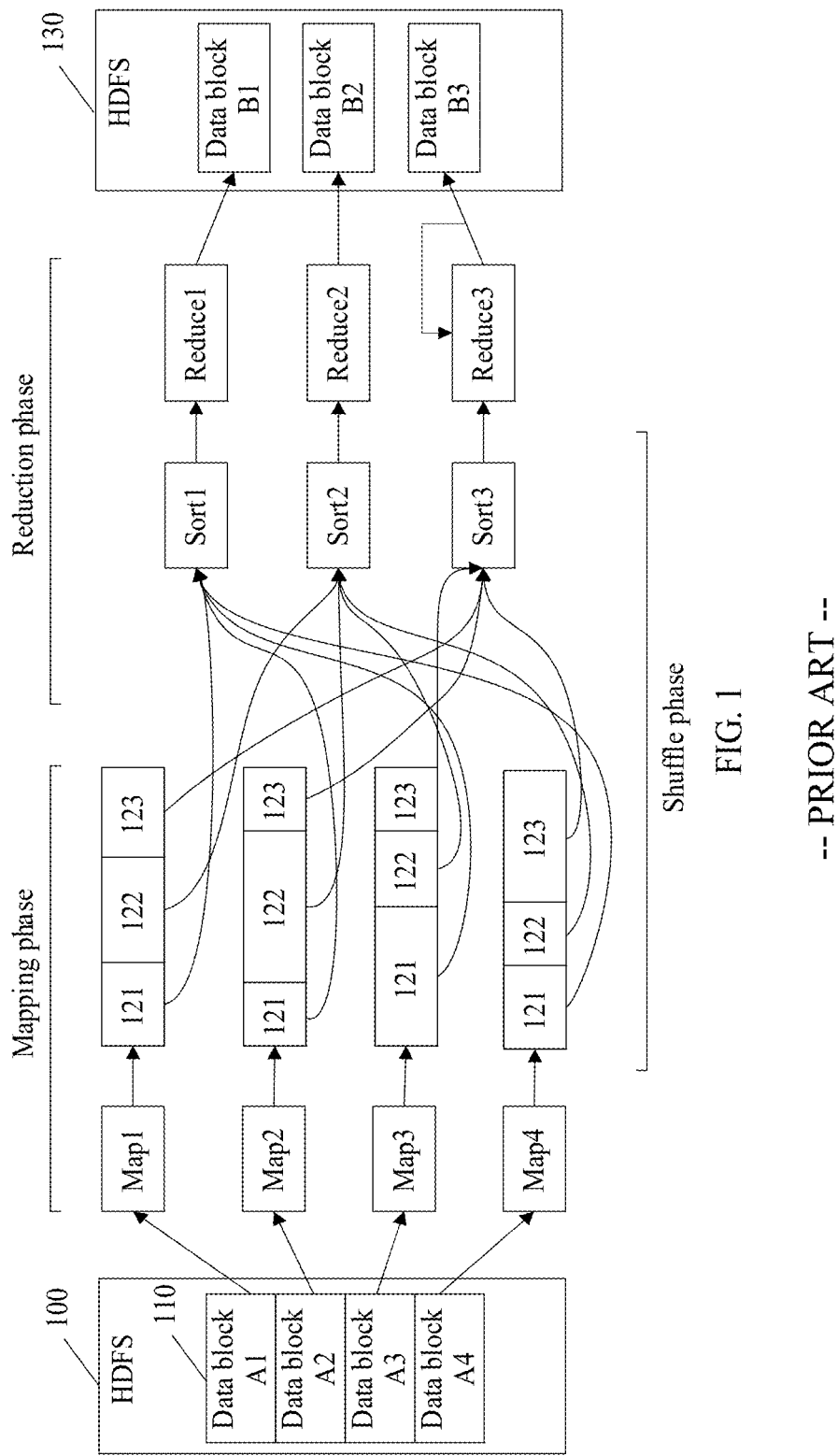
FIG. 1 is a schematic diagram of a map-reduce framework.

FIG. 1 is a schematic diagram of a map-reduce framework. As shown in FIG. 1, a data processing process of the mapping reduction framework includes a mapping (map) phase and a reduction (reduce) phase. A processing process from output of an operator in the mapping phase to input of an operator in the reduction phase is referred to as a shuffle (shuffle) phase. The shuffle phase may include storage and partitioning of the output data of the operator in the mapping phase, copying/pulling, merging, sorting, and the like of the input data in the reduction phase.

It may be considered that, in the shuffle phase, a computation result of a previous phase is distributed, through shuffle, to a physical node used for computation or storage of a result in a next phase.

With reference to FIG. 1, data 110 to be processed is stored on a hadoop distributed file system (hadoop distributed file system, HDFS) 100. When the data 110 to be processed is processed, data partitioning may be performed first. The data 110 to be processed is partitioned into four data blocks: a data block A1, a data block A2, a data block A3, and a data block A4. Then the four data blocks are input into four mapping computing nodes (which are respectively map1, map2, map3, and map4, that perform same processing) for processing. The data block A1 is input into map1 for processing, the data block A2 is input into map2 for processing, the data block A3 is input into map3 for processing, and the data block A4 is input into map4 for processing, to obtain corresponding processing results. Based on labels 121, 122, and 123 corresponding to the three reduction computing nodes in the reduction phase, processing results of the mapping computing nodes are partitioned into three data blocks and stored, to complete processing in the mapping phase.

After the mapping phase, the reduction phase begins. Each reduction computing node copies/pulls data from a corresponding mapping computing node for processing. A first reduction computing node (including sort1 and reduce1) pulls a data block whose label is 121 from each mapping computing node, after obtaining the data block, sorts data in the data block through sort1, and inputs the sorted data into reduce1 for processing, to obtain a processing result data block B1. A second reduction computing node (including sort2 and reduce2) pulls a data block whose label is 122 from each mapping computing node, after obtaining the data block, sorts data in the data block through sort2, and inputs the sorted data into reduce2 for processing, to obtain a processing result data block B2. A third reduction computing node (including sort3 and reduce3) pulls a data block whose label is 123 from each mapping computing node, after obtaining the data block, sorts data in the data block through sort3, and inputs the sorted data into reduce3 for processing, to obtain a processing result data block B3. Then, the data block B1, the data block B2, and the data block B3 are stored in an HDFS 130.

In the mapping reduction framework shown in FIG. 1, the mapping computing node and the reduction computing node are connected over a network. Due to a limited memory capacity, a processing result of each mapping computing node needs to be stored in a local disk. The reduction computing node needs to read data from a disk of a corresponding mapping computing node, and then transmit the data to the local for processing over a network.

Figure 2:
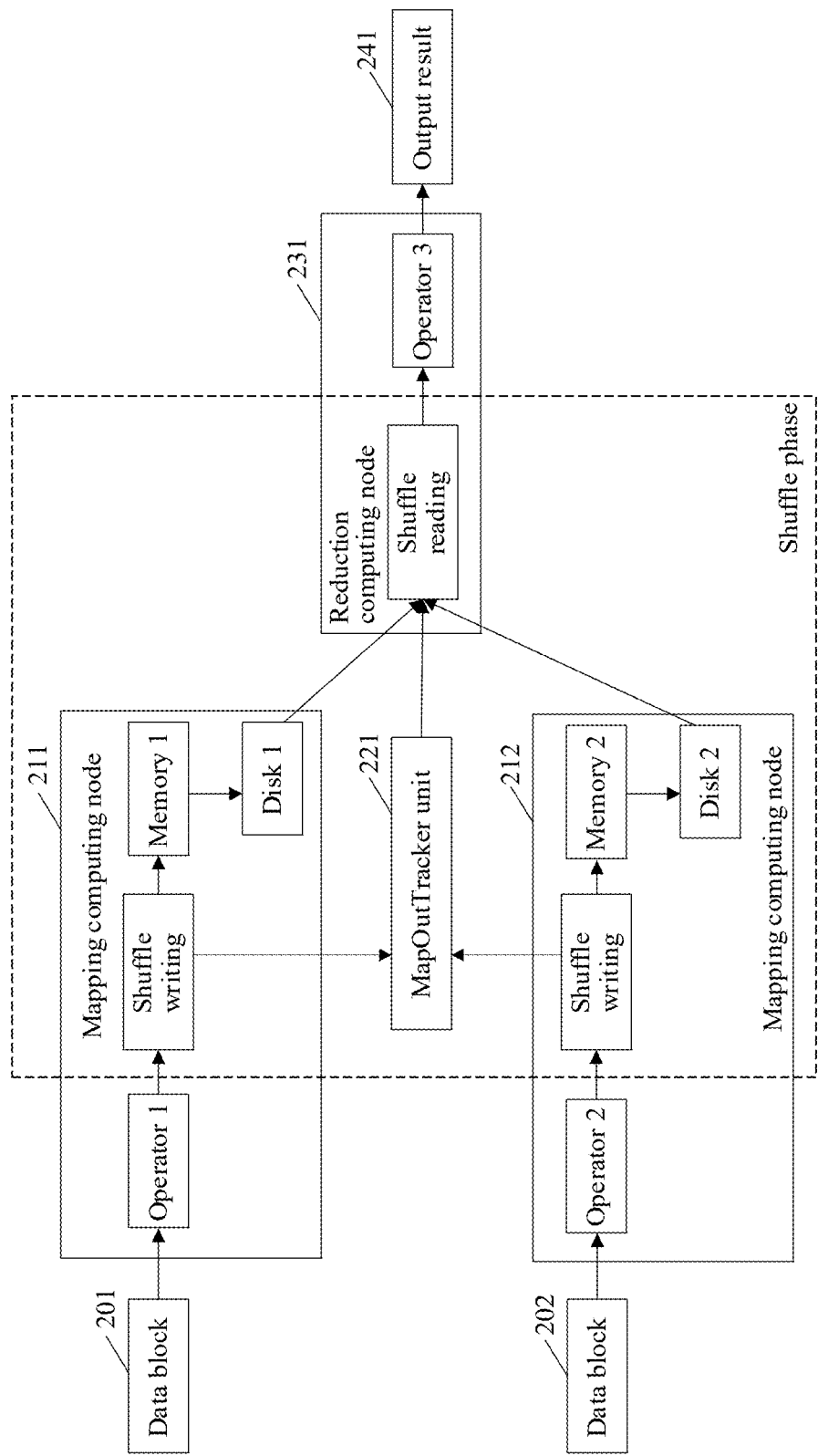
FIG. 2 is a schematic diagram of a processing process of a shuffle phase.

FIG. 2 is a schematic diagram of a processing process of a shuffle phase. As shown in FIG. 2, the data to be processed is a data block 201 and a data block 202. The data block 201 and the data block 202 are respectively input into a mapping computing node 211 and a mapping computing node 212 for processing. The mapping computing node 211 processes the data block 201 through an operator 1, to obtain a processing result. Then shuffle writing (shuffle write) is performed to partition the processing result of the operator 1, and the processing result is stored in the memory 1. After the memory 1 is full, a spill (spill) operation is performed, and data in the memory 1 is stored in a disk 1. This process is repeated until the data block 201 is processed completely. In addition, when the shuffle writing is performed, metadata that describes disk file information in which a processing result of the operator 1 is located is stored into a map out tracker (MapOutTracker) unit 221.

The mapping computing node 212 processes the data block 202 through an operator 2, to obtain a processing result. Then shuffle writing (shuffle write) is performed to partition the processing result of the operator 2, and the processing result is stored in the memory 2. After the memory 2 is full, a spill (spill) operation is performed, and data in the memory 2 is stored in a disk 2. This process is repeated until the data block 202 is processed completely. In addition, when the shuffle writing is performed, metadata that describes disk file information in which a processing result of the operator 2 is located is stored into a map out tracker unit 221. The operator 1 and the operator 2 perform same processing.

When a reduction computing node 231 operates, the reduction computing node 231 first obtains, from the map out tracker unit 221, metadata of the data to be read, performs shuffle reading (shuffle read) based on the metadata, reads corresponding data from the disk 1 of the mapping computing node 211 and the disk 2 of the mapping computing node 212 over a network, and then processes the data through an operator 3 to obtain an output result 241.

It can be learned from the foregoing example that, in a shuffle phase of an existing map-reduce framework, a processing result of each mapping computing node is stored in a disk. The reduction computing node needs to read data from a disk of a plurality of mapping computing nodes, and then transmit the data to the local for processing over a network. In this process, slow disk reading/writing severely affects data transmission efficiency. In addition, a large amount of data is transmitted between computing nodes over a network in a short time, and physical bandwidth and an absolute transmission delay of the network also greatly affect the data transmission efficiency, thereby affecting processing efficiency in the shuffle phase.

In some technical solutions, to relieve memory capacity pressure and network transmission pressure, in the shuffle phase (shuffle phase), processing such as serialization, sorting, compression, delivery to a hard disk, network transmission, decompression, deserialization, and the like, is usually performed on intermediate data (namely, a processing result of a mapping computing node) that needs to be transmitted. Although memory capacity pressure and network transmission pressure can be partially relieved in this way, it also brings redundancy overheads. In addition, problems of limited memory capacity and relatively low data transmission efficiency cannot be fundamentally resolved. Therefore, processing efficiency in a shuffle phase cannot be effectively improved.

In addition, when data is transmitted over a network, that is, when the reduction computing node copies/pulls data from the mapping computing node over the network, the transmission control protocol (transmission control protocol, TCP) and the Internet protocol (Internet Protocol, IP) are used. During transmission, data needs to be copied in the TCP/IP protocol stack for a second time. A processor (central processing unit, CPU) of the mapping computing node copies data from an application layer to a TCP kernel sending buffer across modes (from a user mode to a kernel mode), and sends the data to the reduction computing node through a network adapter (namely, a network interface card). In addition, a CPU of the reduction computing node copies data, received through a network adapter (namely, a network interface card), from a TCP kernel receiving buffer to the application layer across modes (from a kernel mode to an application mode). Data is copied in the TCP/IP protocol stack for a second time, this consumes a large amount of CPU time. As a result, the absolute transmission delay is high (usually at the 10 ms level), affecting the data transmission efficiency.

In some technical solutions, limited by a memory capacity of a computing node, a compromise method is used to cache some frequently used temporary data in a memory. An acceleration is achieved by implementing the method for some specific scenarios. However, intermediate data in a shuffle phase still needs to be stored in a disk, so memory acceleration is limited, and a problem of limited memory capacity cannot be resolved.

In some technical solutions, in order to improve network transmission efficiency, a remote direct memory access (Remote Direct Memory Access, RDMA) technology is used in a data transmission process in a shuffle phase. The data of the mapping computing node can be directly sent to the application layer of the reduction computing node through an RDMA network adapter. In this way, it does not need to copy the data in the TCP/IP protocol stack for a second time, reducing the time overhead and CPU usage. However, in this method, data needs to be copied across nodes, memory occupation increases (memory occupation is twice that of intermediate data), and intermediate data in the shuffle phase is still stored in a file form. Data transmission is based on semantics of input/output (input/output, IO) with relatively large overheads, that is, file system invoking overheads exist. Therefore, compared with memory access, a relatively high absolute transmission delay still exists when data is transmitted between computing nodes through RDMA.

To resolve the foregoing technical problems, this application provides a method for processing data. The method for processing data in this embodiment of this application is applied to a distributed processing system. According to the method, data reading/writing in a shuffle phase can be implemented through a memory operation, based on a global memory formed by memory interconnection of a plurality of computing nodes in the distributed processing system. Therefore, intermediate data does not need to be copied and transmitted in the shuffle phase. In this way, a processing process in the shuffle phase is not limited by factors such as a memory capacity of a computing node, physical bandwidth of a transmission network, a transmission delay, and the like. In addition, data in the shuffle phase can be read and written in a memory manner based on efficient memory semantics, thereby improving processing efficiency of the shuffle phase, and improving processing efficiency of the distributed processing system for massive data.

In a possible implementation, the distributed processing system may include a distributed system configured to process massive data, such as a server cluster or a data center. A specific type of the distributed processing system is not limited in this application.

In a possible implementation, the distributed processing system may include a plurality of mapping servers and a plurality of reduction servers. The plurality of mapping servers and the plurality of reduction servers are configured to process data.

In a possible implementation, the distributed processing system may include at least one shuffle phase. In any shuffle phase, input data of each reduction server is from output data of the plurality of mapping servers. The plurality of mapping servers may be considered as a front end, the plurality of reduction servers may be considered as a back end, and output data of the front end is used as input data of the back end.

In a possible implementation, the memories of the plurality of mapping servers and the memories of the plurality of reduction servers in the distributed processing system may be connected in a manner of memory interconnection, such as a system bus, a peripheral component interconnect express (peripheral component interconnect express, PCIE) bus, a GEN-Z bus, an RDMA, and the like. Therefore, the memories of the plurality of mapping servers and the memories of the plurality of reduction servers form the global memory. Each mapping server and each reduction server in the distributed processing system may access the global memory in a memory manner (using memory operation instructions). A specific manner of memory interconnection is not limited in this application.

In a possible implementation, the mapping server may perform registration by using a preset register instruction after the mapping server is connected to the distributed processing system, so that the memory of the mapping server is added to the global memory. For example, the preset register instruction is a register instruction. After the mapping server is connected to the distributed processing system, and the memory of the mapping server is interconnected with a memory of another server (including the mapping server and the reduction server) in the distributed processing system through the system bus, the mapping server may send the register instruction (namely, the preset register instruction) to the system bus, and perform registration on the system bus, so that the memory of the mapping server is added to the global memory. The system bus may further send a confirmation instruction such as registration completion or registration success to the mapping server, so that the mapping server obtains permission to access the global memory.

In a possible implementation, the reduction server may also perform registration by using a preset register instruction after the reduction server is connected to the distributed processing system, so that the memory of the reduction server is added to the global memory. For example, the preset register instruction is a register instruction. After the reduction server is connected to the distributed processing system, and the memory of the reduction server is interconnected with a memory of another server (including the mapping server and the reduction server) in the distributed processing system through the system bus, the reduction server may send the register instruction (namely, the preset register instruction) to the system bus, and perform registration on the system bus, so that the memory of the reduction server is added to the global memory. The system bus may further send a confirmation instruction such as registration completion or registration success to the reduction server, so that the reduction server obtains permission to access the global memory.

In this manner, the memory of the reduction server and the memory of the mapping server that are added to the distributed processing system can be managed in a unified manner, thereby implementing unified management of the global memory.

In a possible implementation, after the global memory is constructed, an address mapping relationship between the global memory and a memory of each mapping server and a memory of each reduction server may be further established, to perform address mapping during data reading/writing.

In a possible implementation, both the memory of the mapping server and the memory of the reduction server are multi-level memories. The multi-level memory may include at least two of a double data rate synchronous dynamic random access memory (Double Data Rate Synchronous Dynamic Random Access Memory, DDR SDRAM, also referred to as DDR for short), a dynamic random access memory (dynamic random access memory, DRAM), an Optane memory (optane memory), or another memory accessed in a memory manner. The Optane memory may also be referred to as an AEP (Apache Pass) memory.

In a possible implementation, a multi-level memory may be constructed based on a reading/writing speed of the memory. A higher reading/writing speed indicates a higher memory level. For example, a reading/writing speed of the DDR is higher than a reading/writing speed of the Optane memory. The multi-level memory may be set to "DDR+Optane memory". In a process of using the multi-level memory, the DDR is preferentially used, and the Optane memory is used after the DDR is full. Similarly, the multi-level memory may also be set to "DRAM+Optane memory". A person skilled in the art may set the multi-level memory based on an actual situation. This is not limited in this application.

If the memory of the mapping server and the memory of the reduction server are both multi-level memories, the global memory formed by interconnecting the memories of the plurality of mapping servers and the memories of the plurality of reduction servers is also a multi-level memory.

Figure 3:
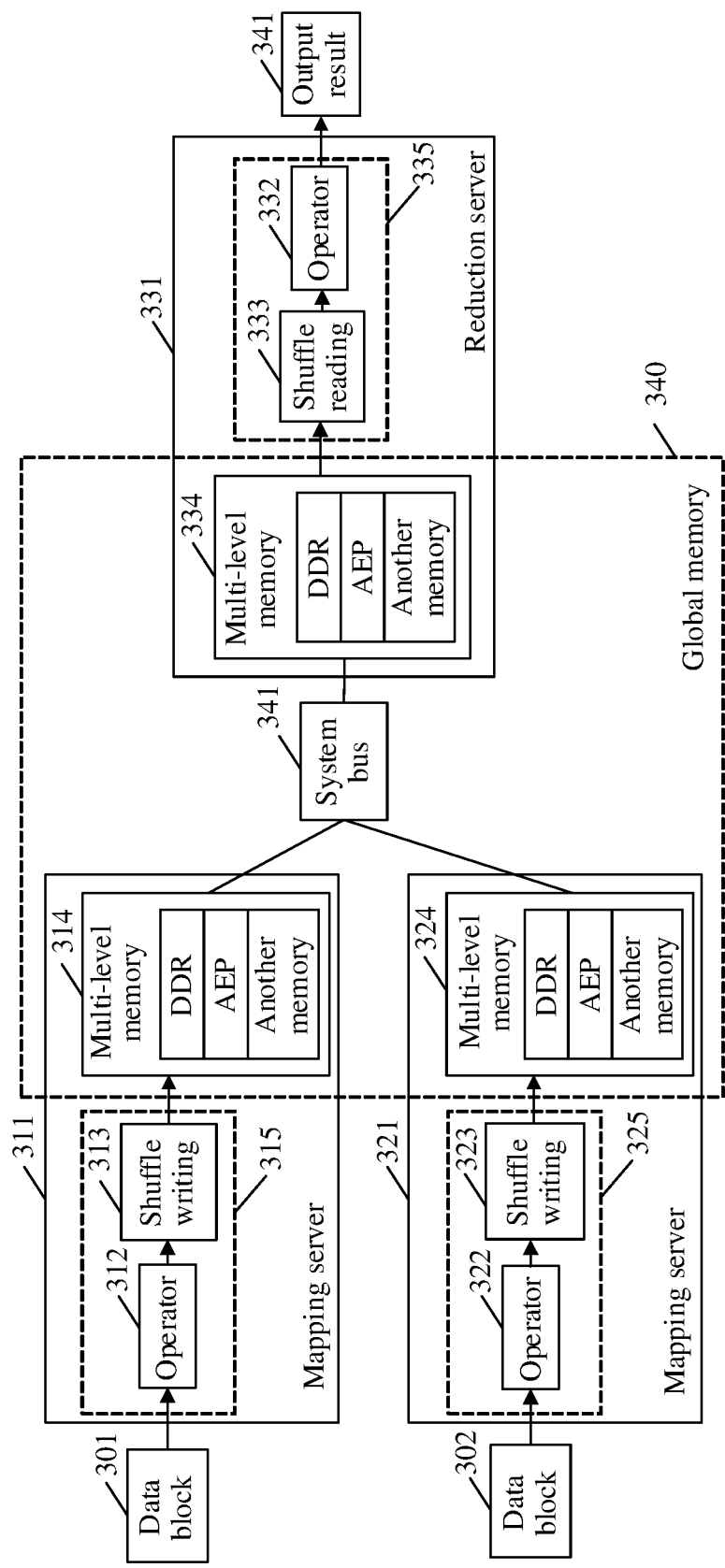
FIG. 3 is a schematic diagram of a distributed processing system according to an embodiment of this application.

FIG. 3 is a schematic diagram of an application scenario of a method for processing data according to an embodiment of this application. As shown in FIG. 3, the method for processing data is applied to a distributed processing system. The distributed processing system includes two mapping servers (a mapping server 311 and a mapping server 321) and one reduction server 331. A multi-level memory 314 (DDR+AEP+another memory) of the mapping server 311, a multi-level memory 324 (DDR+AEP+another memory) of the mapping server 321, and a multi-level memory 334 (DDR+AEP+another memory) of the reduction server 331 are connected through a system bus 314, to form the global memory. That is, the global memory 340 in FIG. 3 includes the multi-level memory 314, the multi-level memory 324, and the multi-level memory 334.

Refer to FIG. 3. The distributed processing system processes a data block 301 and a data block 302. The data block 301 is input into the mapping server 311, and the mapping server 311 executes a maptask (maptask) 315. To be specific, the mapping server 311 processes the data block 301 through an operator 312, to obtain a processing result, then performs shuffle writing 313, and writes the processing result into the global memory 340 by using memory operation instructions. Similarly, the data block 302 is input into the mapping server 321, and the mapping server 321 executes a maptask (maptask) 325. To be specific, the mapping server 321 processes the data block 302 through an operator 322, to obtain a processing result, then performs shuffle writing 323, and writes the processing result into the global memory 340 by using memory operation instructions. The operator 312 is a first operator for processing the input data (the data block 301), and the operator 322 is a first operator for processing the input data (the data block 302).

After the mapping server 311 and the mapping server 321 complete processing, the reduction server 331 executes a reducetask (reducetask) 335. To be specific, the reduction server 331 first executes a shuffle reading 333, reads data from the global memory 340 by using the memory operation instructions, and then processes the read data through an operator 332, to obtain an output result 341. The operator 332 is a second operator that runs on the reduction server and that processes the processing result of the mapping server.

It should be noted that the distributed processing system and the global memory are described above by using only two mapping servers and one reduction server as an example. A person skilled in the art should understand that the distributed processing system may include a plurality of mapping servers and a plurality of reduction servers. A quantity of the mapping servers and a quantity of the reduction servers in the distributed processing system are not limited in this application.

Figure 4:
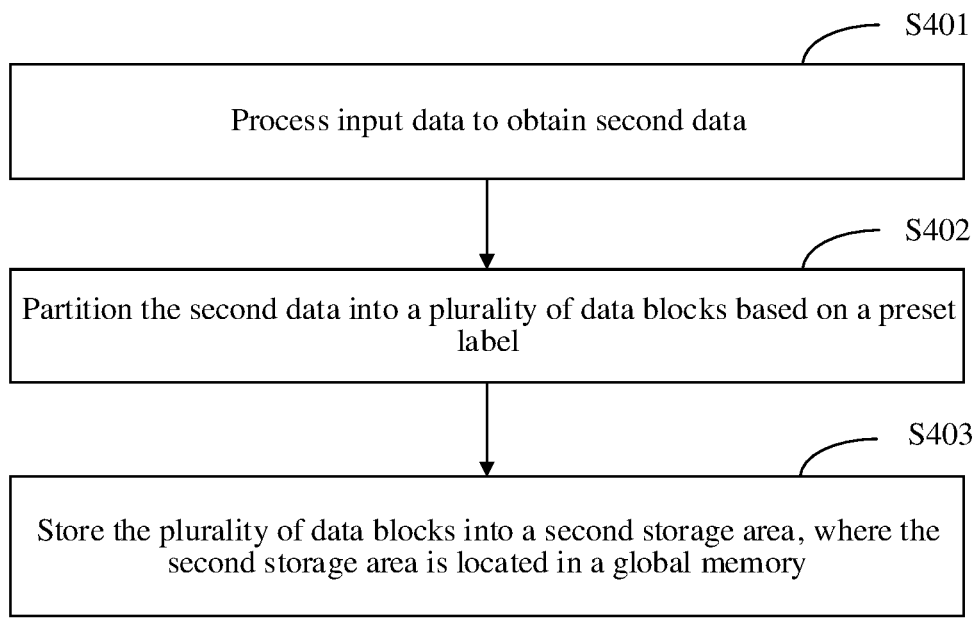
FIG. 4 is a flowchart of a method for processing data according to an embodiment of this application.

FIG. 4 is a flowchart of a method for processing data according to an embodiment of this application. As shown in FIG. 4, the method is applied to a mapping server in a distributed processing system, and the method includes the following steps.

Step S401: Process input data to obtain second data.

In a possible implementation, the distributed processing system may include a plurality of mapping servers. For massive data to be processed, the distributed processing system may segment the massive data to be processed based on a quantity of the mapping servers. For example, the massive data to be processed may be partitioned, through a split function split( ), into a plurality of data blocks to be processed, and then one or more data blocks to be processed are used as input data of the mapping server.

For example, if the quantity of the mapping servers is 4 and a quantity of the data blocks to be processed is also 4, for each mapping server, one data block to be processed is allocated as the input data. If the quantity of the mapping servers is 4 and the quantity of the data blocks to be processed is 8, for each mapping server, two data blocks to be processed are allocated as the input data.

After receiving the input data, the mapping server may perform processing such as format conversion, data screening, or calculation on the input data through the first operator, to obtain second data. In other words, the second data is a processing result of the mapping server for the input data.

For example, the massive data to be processed is a population archive of country X, and the distributed processing system needs to analyze and collect statistics on the population by provinces. The massive data to be processed may be partitioned into a plurality of data blocks to be processed, and the plurality of data blocks to be processed are used as the input data of the mapping server in the distributed processing system. The mapping server may extract preset population key information, such as a name, a date of birth, a place of household, a residence and the like, from the input data, to obtain second data.

Step S402: Partition the second data into a plurality of data blocks based on a preset label.

In a possible implementation, the preset label may be preset based on a use scenario and a keyword of the massive data to be processed. For example, the massive data to be processed is a population archive of country X, and the distributed processing system needs to analyze and collect statistics on the population by provinces. In this scenario, the province of the household may be used as the preset label, and a quantity of the preset labels is the same as the total quantity of the provinces and cities in country X.

In a possible implementation, when the preset label is determined, a quantity of reduction servers in the distributed processing system may also be considered. For example, the quantity of the preset labels may be determined based on the quantity of the reduction servers first, and then the preset labels are made corresponding to the keyword of the massive data to be processed.

It should be noted that the preset label may be further set in another manner, and a manner of setting the preset label and a setting basis are not limited in this application.

In a possible implementation, after second data is obtained, in step S402, the second data may be partitioned into the plurality of data blocks based on the preset label in a manner such as searching, matching, and hashing. For example, it is assumed that the preset label is the province of the household, and the quantity of the preset labels is 10. The second data may be partitioned into 10 data blocks based on the province of the household. Optionally, when the second data does not include data of one or more provinces, the quantity of the data blocks obtained by partitioning the second data is less than 10.

In a possible implementation, when the second data is partitioned into the plurality of data blocks, data may be selected from the second data in a hash (hash) manner, to partition the second data into the plurality of data blocks. In this manner, sorting does not need to be performed before the second data is partitioned, so that processing efficiency of partitioning the second data can be improved.

Step S403: Store the plurality of data blocks into a second storage area, where the second storage area is located in a global memory.

In a possible implementation, before storing the plurality of data blocks into the second storage area, the mapping server may apply, based on a size of the second data, to the global memory for storage space by using a memory allocation instruction, for example, an allocate (size) instruction, where size indicates the size of the second data. After the applying succeeds, the storage space that is applied for and obtained is used as the second storage area for storing the second data. In this manner, the mapping server can apply for second storage space dynamically based on the size of the second data, thereby saving memory space and improving memory utilization.

In a possible implementation, the mapping server may alternatively pre-allocate the second storage area in the global memory to the second data based on a preset first size. When the size of the second data is greater than the second storage area, that is, when space of the second storage area is insufficient, the mapping server dynamically applies for storage space as required actually. In this manner, the second storage space can be allocated to the second data in advance. Therefore, a number of dynamically applying for storage space during operation is reduced, thereby improving processing efficiency.

Because the second storage area is located in the global memory, the second storage area may be located locally (in a physical memory of the mapping server), or may be located remotely (in a physical memory of another server). When the plurality of data blocks are stored into the second storage area, a third address of the second storage area may be determined, and whether the third address is within an access range of the mapping server may be determined. If the third address is within the access range of the mapping server, address mapping does not need to be performed. The mapping server may directly store the plurality of data blocks into the second storage area through a write data instruction, for example, a store instruction.

If the third address is outside the access range of the mapping server, address mapping needs to be performed. The third address may be mapped, based on a preset address mapping relationship, to a fourth address within the access range of the mapping server through an address mapping instruction, for example, a map instruction. The plurality of data blocks are then stored into the second storage area based on the fourth address.

Address mapping is performed when the third address is outside the access range of the mapping server, so that the mapping server can access the second storage area located remotely.

In a possible implementation, the first operator that is in the mapping server and that processes the input data is corresponding to the second storage area. To be specific, each first operator is corresponding to one second storage area. When data in the plurality of data blocks needs to be sorted, the second storage area may be partitioned into a plurality of sub-areas based on a preset second size, and the plurality of data blocks are stored into the plurality of sub-areas according to a sequence of the sub-areas. When the plurality of data blocks are stored into the plurality of sub-areas in sequence, data in all the sub-areas in which storage has been performed is sorted by updating an ordered index linked list. The ordered index linked list is sorted by linking a location index of data by using a linked list.

This manner of sorting during writing may be considered as an asynchronous pipeline (pipeline) manner. In this manner, when the data in the plurality of data blocks is written to the second storage area, the written data can be sorted, so that the data is directly sorted during writing, that is, sorting is performed while writing. The following describes an example of a processing process of data sorting during writing with reference to FIG. 5.

Figure 5:
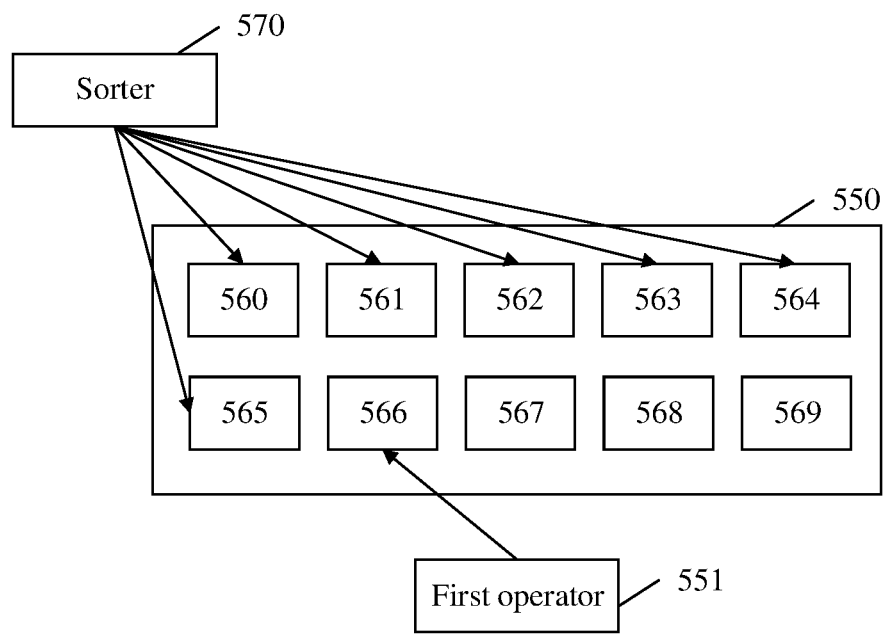
FIG. 5 is a schematic diagram of sorting data during writing in a method for processing data according to an embodiment of this application.

FIG. 5 is a schematic diagram of sorting data during writing in a method for processing data according to an embodiment of this application. As shown in FIG. 5, based on a preset second size, a second storage area (located in a global memory) 550 corresponding to a first operator (namely, a maptask) 551 of a mapping server may be partitioned into 10 sub-areas or memory slices (slice), which are sub-areas 560 to 569 respectively. The sub-areas 560 to 564 have performed storage, that is, the first operator 551 has performed shuffle writing (shuffle write) to the sub-areas 560 to 564, and data stored in the sub-areas 560 to 564 has been sorted. The sub-area 565 has performed storage, but data stored in the sub-area 565 has not been sorted. The sub-areas 566 to 569 are unused blank areas.

The first operator 551 continues to perform shuffle writing (shuffle write). The first operator 551 may select a first blank sub-area 566 from the second storage area 550 according to a sequence of the sub-areas, perform data writing in an exclusive manner, and establish (or record) a location index for each piece of written data in a manner such as a location array. After the sub-area 566 is full, the first operator 551 may select a next blank sub-area 567 to continue to perform data writing, and notify (for example, through a message or the like) a sorter (sorter) 570 that the sub-area 566 has completed writing.

When the first operator 551 writes the sub-area 566, the sorter 570 may perform merge sorting on data in the sub-area 565 and sorted data in the sub-areas 560 to 564 through an ordered index linked list, so that the data stored in the sub-areas 560 to 565 is sorted as a whole. Optionally, the sorter 570 may read data in sequence based on the location index of the sub-area 565, and then merge sort the read data and the sorted data (namely, the data in the sub-areas 560 to 564) in a manner such as bucket sorting, and update the ordered index linked list to obtain a sorting result. The ordered index linked list is used during sorting, so that no data copy occurs in a sorting process.

After sorting the sub-area 565, the sorter 570 receives a notification indicating that writing to the sub-area 566 is completed, and then merge sorts data stored in the sub-area 566 and the sorted data in the sub-areas 560 to 565 in a similar manner.

Optionally, when the mapping server runs on the Java platform, a native sorter may be used during sorting to perform out-of-heap bucket sorting. In-heap merge sorting that runs on the Java virtual machine (Java virtual machine, JVM) is slow, and memory spill causes low disk I/O and sorting algorithm efficiency. Therefore, using the native sorter to perform out-of-heap bucket sorting can effectively improve the sorting efficiency.

Data writing and sorting are performed in an asynchronous pipeline (pipeline) manner, and the ordered index linked list is used during sorting. In this way, sorting can be performed while writing, thereby implementing direct sorting during writing. In addition, a data copy step during separate sorting can be removed, thereby reducing memory occupation and improving processing efficiency of shuffle writing in the shuffle phase. In addition, in this manner, writing and sorting may be further combined into one step, thereby reducing processing steps and improving processing efficiency of the shuffle phase.

According to this embodiment of this application, the mapping server in the distributed processing system can process the input data to obtain second data, partition the second data into a plurality of data blocks based on the preset label, and then store the plurality of data blocks into the second storage area that is located in the global memory. Therefore, a processing result (namely, the second data) of the mapping server may be stored in the global memory in a shuffle phase. In this way, slow disk reading/writing can be avoided. In addition, a processing process of the shuffle phase is not limited by a memory capacity of the mapping server, thereby improving processing efficiency and processing performance of the shuffle phase.

In a possible implementation, after step S403, the method may further include: determining metadata of the plurality of data blocks; and storing the metadata of the plurality of data blocks into a preset first storage area.

The metadata may include attribute information of the plurality of data blocks. The attribute information of each data block includes a storage address of the data block in the global memory. Optionally, the attribute information of each data block may further include at least one of a label, a size (namely, a size), and the like, of the data block. A person skilled in the art may set specific content of the metadata based on an actual situation. This is not limited in this application.

After the plurality of data blocks are stored into the second storage area, metadata of the plurality of data blocks may be determined, and the metadata is stored into the preset first storage area. The first storage area may be located in the global memory, or may be located in another memory that can be accessed by a plurality of mapping servers and a plurality of reduction servers. A specific location of the first storage area is not limited in this application.

The metadata of the plurality of data blocks is determined, and the metadata is stored into the first storage area. In this way, the reduction server can obtain, from the first storage area, metadata of the data to be read, for example, a label, a storage address, and the like.

Figure 6:
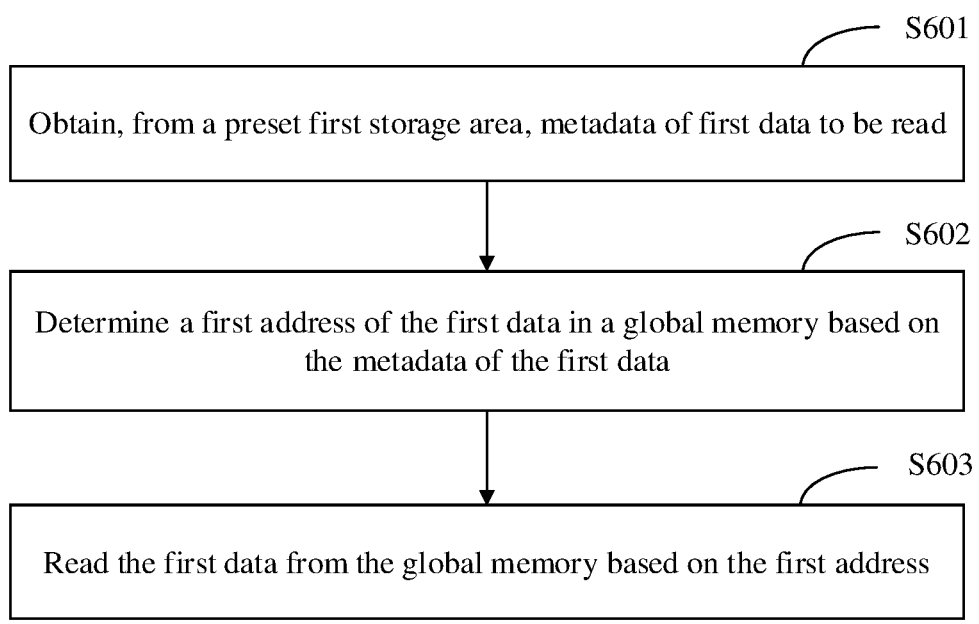
FIG. 6 is a flowchart of a method for processing data according to an embodiment of this application.

FIG. 6 is a flowchart of a method for processing data according to an embodiment of this application. As shown in FIG. 6, the method is applied to a reduction server in a distributed processing system, and the method includes the following steps.

Step S601: Obtain, from a preset first storage area, metadata of first data to be read.

In a possible implementation, second data includes a processing result of a front-end mapping server in the distributed processing system for input data. For any back-end reduction server, its first data to be read may include a target data block in a plurality of data blocks of the second data. In other words, the first data is the target data block that is in the plurality of data blocks of the second data and that is processed by the reduction server.

In the mapping phase, the second data is partitioned into a plurality of data blocks based on a preset label and is stored in the global memory. Metadata of the plurality of data blocks is stored in the first storage area. In the reduction phase, the reduction server may obtain, from the first storage area based on a target label that is in the preset label and that is corresponding to the first data to be processed, the metadata of the target data block included in the first data.

When there are a plurality of target data blocks included in the first data, metadata of each target data block may be obtained from the first storage area.

Step S602: Determine a first address of the first data in the global memory based on the metadata of the first data.

After the metadata of the first data is obtained, the first address (namely, a storage address) of the first data in the global memory may be obtained from the metadata. When there are a plurality of target data blocks included in the first data, a first address of each target data block in the global memory may be determined from the metadata of each target data block.

Step S603: Read the first data from the global memory based on the first address.

Because the first address is located in the global memory, the first address may be located locally (in a physical memory of the reduction server), or may be located remotely (in a physical memory of another server). When the first data is read from the global memory, it may be determined whether the first address is within an access range of the reduction server. If the first address is within the access range of the reduction server, address mapping does not need to be performed. The reduction server may directly read the first data from the global memory through a data read instruction, for example, a load instruction.

If the first address is outside the access range of the reduction server, address mapping needs to be performed. The first address may be mapped, based on a preset address mapping relationship, to a second address within the access range of the reduction server through an address mapping instruction, for example, a map instruction. The first data is then read, based on the second address, from the global memory through a memory instruction, for example, a load instruction.

Address mapping is performed when the first address is outside the access range of the reduction server, so that the reduction server can read the first data remotely from the global memory.

According to this embodiment of this application, the reduction server in the distributed processing system can obtain, from the first storage area, the metadata of the first data to be read, where the first data includes the target data block in the plurality of data blocks of the second data, and the second data includes the processing result of the corresponding mapping server for the input data. The reduction server then determines the first address of the first data in the global memory based on the metadata, and reads the first data from the global memory based on the first address. Therefore, when the reduction server reads the input data (the first data) including the target data block from the processing results of the plurality of mapping servers, the reduction server does not need to copy and transmit the target data block. Instead, the reduction server directly reads, in a memory manner, the target data block that is stored in the global memory. In this way, a processing process in the shuffle phase is not limited by factors such as a memory capacity of a computing node, physical bandwidth of a transmission network, a transmission delay, and the like. In addition, processing efficiency and processing performance in the shuffle phase can be improved, thereby improving processing efficiency of the distributed processing system.

It may be understood that, in a specific implementation, the global memory is not infinitely large. If the plurality of mapping servers concurrently execute the method shown in FIG. 4, the plurality of mapping servers may need to store a large amount of data in the global memory. However, storage space of the global memory is limited, and the global memory may be unable to store the large amount of data. As a result, an application cannot run normally or has low running efficiency.

To avoid the foregoing case, this application provides a memory management apparatus. The apparatus may manage the global memory. When the storage space of the global memory is insufficient, the apparatus stores part of data in the global memory into an external storage area, to free up space for storing data to be stored. When available storage space of the global memory becomes larger, the data stored into the external storage area can be retrieved and stored into the global memory. In this way, a reduction server that needs to read this part of data can read the corresponding data from the global memory instead of reading the data from the external storage area, thereby improving data reading efficiency.

In a specific embodiment of this application, the external storage area includes but is not limited to at least one of the following: an HDD, an SSD, or a hard disk of another type. Optionally, the external storage area may alternatively be an HDFS shared by the plurality of mapping servers and the plurality of reduction servers, or the like.

In a specific embodiment of this application, the memory management apparatus may be a software module deployed on a single mapping server. Optionally, the memory management apparatus may alternatively be implemented by hardware of the mapping server. For example, a processor in the mapping server implements a function of the memory management apparatus. In this case, the memory management apparatus may manage all space of the global memory, or may manage only memory space allocated by the global memory to the mapping server where the memory management apparatus is located.

Optionally, the memory management apparatus may be an independent device, or may be a software module deployed on an independent device, or the like. In this case, the memory management apparatus may manage all space of the global memory.

Figure 7:
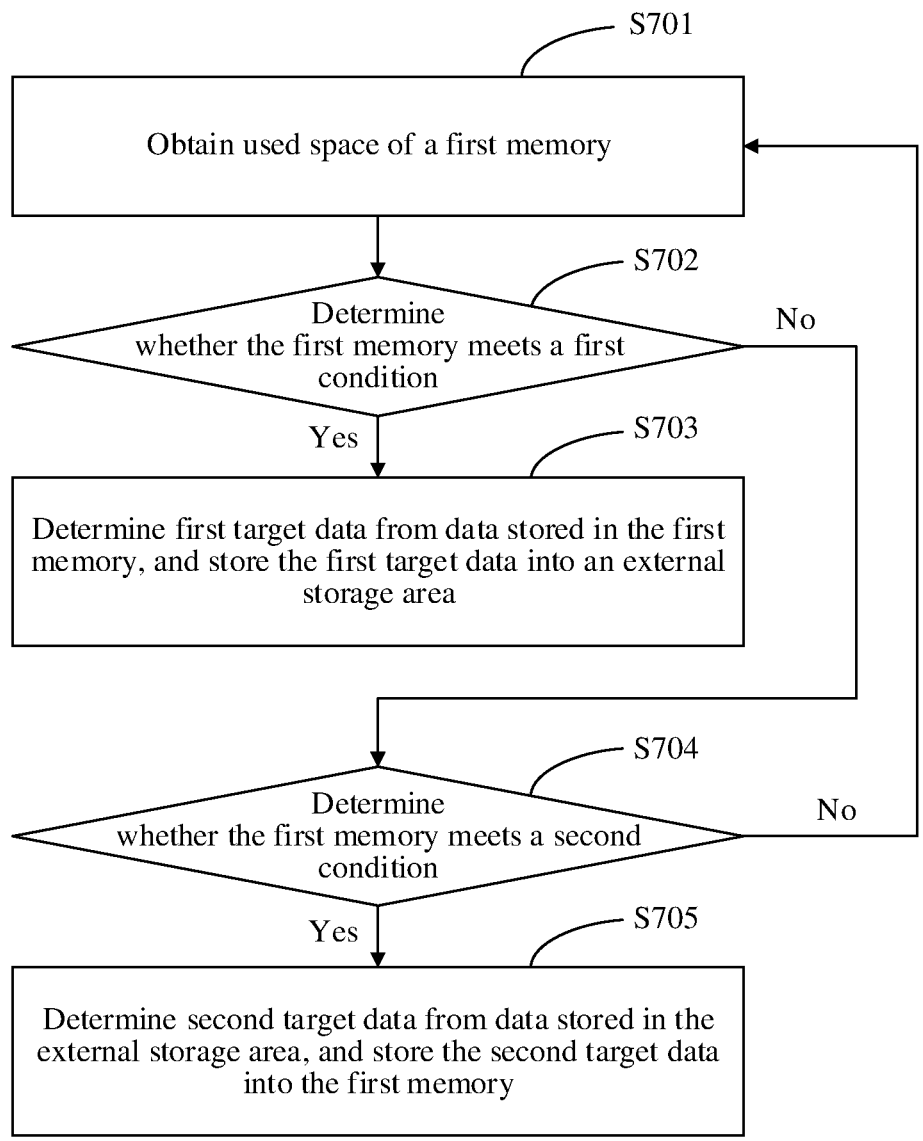
FIG. 7 is a flowchart of managing a global memory by a memory management apparatus according to an embodiment of this application.

Refer to FIG. 7. A specific process in which the memory management apparatus manages the global memory includes the following steps.

S701: The memory management apparatus obtains used space of a first memory.

When the memory management apparatus is configured to manage all memory space of the global memory, the first memory is the entire memory space of the global memory. When the memory management apparatus is configured to manage the memory space allocated by the global memory to the mapping server where the memory management apparatus is located, the first memory is the memory space allocated by the global memory to the mapping server where the memory management apparatus is located, that is, a part of the global memory.

S702: The memory management apparatus determines whether the first memory meets a first condition. When it is determined that the first memory meets the first condition, S703 is performed. When it is determined that the first memory does not meet the first condition, S704 is performed.

S703: The memory management apparatus determines first target data from data stored in a first memory, and stores the first target data into the external storage area.

The first condition is that used space of the first memory is greater than or equal to a first threshold. For example, it is assumed that the total space of the first memory is 100 M, the first threshold may be 80 M. Alternatively, the first condition is that a ratio of the used space of the first memory to total space of the first memory is greater than or equal to a second threshold. For example, it is assumed that the total space of the first memory is 100 M, the second threshold may be 80%. The first threshold and the second threshold may be set based on an actual situation, which is not specifically limited herein.

In a specific embodiment of this application, the memory management apparatus may determine, based on a priority of the data stored in the first memory, the first target data from the data stored in the first memory. Specifically, the first target data may be part of data with a lower priority in the data stored in the first memory.

When storing the first target data into the external storage area, the memory management apparatus may store the first target data based on the priority of the data. To be specific, data with the lower priority gets out of the first memory first, and data with a higher priority gets out of the first memory later.

The priority of the data stored in the first memory may be represented in any one of the following manners.

Manner 1: The priority of the data stored in the first memory may be represented by an ID of a sub-area to which the data belongs.

Specifically, when applying to the first memory for the second storage area, the mapping server may apply to the first memory for the second storage area including a preset quantity of sub-areas based on a quantity of the reduction servers, where each sub-area corresponds to a unique reduction server. That is, the preset quantity is the same as the quantity of the reduction servers, and each sub-area corresponds to a unique identification (identification, ID). Optionally, a sub-area with a smaller ID may correspond to a reduction server that needs to start a data reading task first, and a sub-area with a larger ID corresponds to a reduction server that starts a data reading task later. Alternatively, a sub-area with a larger ID corresponds to a reduction server that needs to start a data reading task first, and a sub-area with a smaller ID corresponds to a reduction server that starts a data reading task later.

When storing the data into the second storage area, the mapping server may store, based on a sub-area ID, the data corresponding to the different reduction servers into the sub-area corresponding to each reduction server. Subsequently, the reduction server may read the corresponding data from the corresponding sub-area based on the sub-area ID. For example, a reduction server whose identification is 001 corresponds to a sub-area whose identification is 1, and the reduction server may read data from the sub-area whose identification is 1. A reduction server whose identification is 002 corresponds to a sub-area whose identification is 2, and the reduction server may read data from the sub-area whose identification is 2.

When the mapping server stores data into a corresponding sub-area based on a sub-area ID, a priority of data stored in the first memory is represented by an ID of a sub-area to which the data belongs. Specifically, when a sub-area with a smaller ID corresponds to a reduction server that needs to start a data reading task first, and a sub-area with a larger ID corresponds to a reduction server that starts a data reading task later, the priority of the data stored in the first memory may be that a priority of data in a sub-area with a smaller ID is higher than a priority of data in a sub-area with a larger ID. When a sub-area with a larger ID corresponds to a reduction server that needs to start a data reading task first, and a sub-area with a smaller ID corresponds to a reduction server that starts a data reading task later, the priority of the data stored in the first memory may be that a priority of data in a sub-area with a larger ID is higher than a priority of data in a sub-area with a smaller ID.

When the priority of the data stored in the first memory is that a priority of data in a sub-area with a smaller ID is higher than a priority of data in a sub-area with a larger ID, the first target data determined by the memory management apparatus from the first memory may be data in a sub-area whose ID is greater than a first preset ID, and the first preset ID may be set based on an actual situation. For example, it is assumed that the first memory includes sub-areas whose IDs are 1 to 10, and the first preset ID is 8. In this case, the first target data includes data in the sub-area whose ID is 9 and data in the sub-area whose ID is 10.

When the priority of the data stored in the first memory is that a priority of data in a sub-area with a larger ID is higher than a priority of data in a sub-area with a smaller ID, the first target data determined by the memory management apparatus from the first memory may be data in a sub-area whose ID is smaller than a second preset ID, and the second preset ID may be set based on an actual situation. For example, it is assumed that the first memory includes sub-areas whose IDs are 1 to 10, and the second preset ID is 3. In this case, the first target data includes data in the sub-area whose ID is 1 and data in the sub-area whose ID is 2.

Manner 2: The priority of the data stored in the first memory may be represented by a sequence of storing data into the first memory.

Specifically, the priority of the data may be that a priority of data first stored into the first memory is lower than a priority of data later stored into the first memory. Alternatively, a priority of data first stored into the first memory is higher than a priority of data later stored into the first memory.

The first case is used as an example. The first target data may be a preset quantity of data that is first stored and that is in the data stored in the first memory. The preset quantity may be set based on an actual situation. For example, it is assumed that 100 pieces of data are successively stored in the first memory, and the preset quantity is 10, the first target data is 10 pieces of data that are in the 100 pieces of data and that are first stored into the first memory.

Manner 3: The priority of the data stored in the first memory may be represented by data amount of the data.

Specifically, the priority of the data may be that a priority of data with a larger data amount is higher than a priority of data with a smaller data amount. Alternatively, a priority of data with a larger data amount is lower than a priority of data with a smaller data amount.

The first case is used as an example. The first target data is data whose data amount is less than or equal to a preset data amount and that is in the data stored in the first memory. The preset data amount may be set based on an actual situation. For example, it is assumed that 100 pieces of data are stored in the first memory, and the preset data amount is 10 KB, the first target data includes data whose data amount is less than or equal to 10 KB and that is in the 100 pieces of data.

It should be noted that the foregoing several manners of reflecting a priority of data are merely examples, and should not be considered as a specific limitation.

S704: The memory management apparatus determines whether the first memory meets a second condition. When it is determined that the first memory meets the second condition, S705 is performed. When it is determined that the first memory does not meet the second condition, S701 is performed.

S705: The memory management apparatus determines second target data from the data stored in the external storage area, and stores the second target data into the first memory.

The second condition is that used space of the first memory is less than or equal to a third threshold. For example, it is assumed that the total space of the first memory is 100 M, the third threshold may be 70 M. Alternatively, the second condition is that a ratio of the used space of the first memory to total space of the first memory is less than or equal to a fourth threshold. For example, it is assumed that the total space of the first memory is 100 M, the fourth threshold may be 70%. The third threshold and the fourth threshold may be set based on an actual situation, which is not specifically limited herein.

The third threshold may be less than the first threshold, and the fourth threshold may be less than the second threshold. Optionally, the third threshold may be equal to the first threshold, and the fourth threshold may be equal to the second threshold.

When the third threshold is equal to the first threshold or the fourth threshold is equal to the second threshold, the memory management apparatus may perform S703 or S705.

In a specific embodiment of this application, corresponding to that the memory management apparatus stores data in the first memory into the external storage area based on the priority of the data, the memory management apparatus may also store data in the external storage area into the first memory based on the priority of the data. To be specific, data with a higher priority gets out of the external storage area first, and data with a lower priority gets out of the external storage area later. A process in which the memory management apparatus determines the second target data from the data stored in the external storage area is similar to the foregoing process in which the memory management apparatus determines the first target data from the data stored in the first memory. For details, refer to the foregoing related descriptions. Details are not described herein again.

It may be understood that, in a process in which the memory management apparatus stores the first target data into the external storage area, available storage space of the first memory gradually increases. To avoid a situation that the reduction server needs to read data from the external storage area when reading data, due to excessive data being stored into the external storage area and too little data remaining in the first memory, the memory management apparatus may monitor the condition of the first memory during the process of storing the first target data into the external storage area. When determining that the first memory meets a third condition, the memory management apparatus stops the operation of storing the first target data into the external storage area. The third condition is that the used space of the first memory is equal to a fifth threshold, or that a ratio of the used space of the first memory to the total space of the first memory is equal to a sixth threshold. The fifth threshold is less than the first threshold, and the sixth threshold is less than the second threshold. The fifth threshold and the sixth threshold may be set based on an actual situation, which is not specifically limited herein.

It can be learned from embodiments of this application that, the memory management apparatus manages the first memory, to resolve a problem that an application cannot run normally or has low running efficiency due to limited space of the first memory.

In a specific embodiment of this application, when storing the first target data into the external storage area, the memory management apparatus may further determine metadata of the first target data, determine metadata of remaining data in the first memory, and update the metadata of the first target data and the metadata of the remaining data in the first memory into the preset first storage area. The metadata of the first target data may include attribute information of the first target data. The attribute information of the first target data includes a storage address of the data in the external storage area, and optionally, may further include at least one of a label, a size, and the like of the data. The metadata of the remaining data in the first memory may include attribute information of the remaining data. The attribute information of the remaining data includes a storage address of the data in the first memory, and optionally, may further include at least one of a label, a size, and the like of the data. A person skilled in the art may set specific content of the metadata of the first target data and the metadata of the remaining data based on an actual situation. This is not limited in this application.

The metadata of the first target data and the metadata of the remaining data in the first memory are determined, and the metadata is stored into the first storage area. In this way, the reduction server can obtain, from the first storage area, metadata of the data to be read, for example, a label, a size, a storage address, and the like.

It may be understood that, the memory management apparatus manages the first memory, so that the first data to be read by the reduction server in step S601 may be all located in the global memory as described in step S601, or may be all located in the external storage area, or may be partially located in the global memory and partially located in the external storage area.

When the first data is all located in the global memory, for a process in which the reduction server reads the first data from the global memory, refer to a method procedure shown in FIG. 6.

When the first data is all located in the external storage area, the address of the first data may be located locally or may be located remotely. When the first data is read from the external storage area, it may be determined whether the address of the first data is located locally. If the address of the first data is located locally, the reduction server may directly read the first data locally. If the address of the first data is located remotely, the reduction server may send a data read request including the address of the first data to the memory management apparatus, requesting to read the first data. After receiving the data read request, the memory management apparatus may find the first data from the remote external storage area based on the address of the first data. The memory management apparatus may then store the first data into the global memory from the remote external storage area, and return the address of the first data in the global memory to the reduction server. Therefore, the reduction server may read the first data from the global memory.

When part of data in the first data is located in the global memory and part of data in the first data is located in the external storage area, the metadata of the first data obtained by the reduction server from the preset first storage area includes metadata of a first part of data and metadata of a second part of data. The first part of data represents data that is in the first data and that is located in the global memory, and the second part of data represents data that is in the first data and that is located in the external storage area.

After the metadata of the first part of data and the metadata of the second part of data are obtained, an address of the first part of data in the global memory may be obtained from the metadata of the first part of data, and an address of the second part of data in the external storage area may be obtained from the metadata of the second part of data. Then, the first part of data is read from the global memory, and the second part of data is read from the external storage area. A process in which the reduction server reads the first part of data from the global memory is similar to the process in which the reduction server reads the first data from the global memory. A process in which the reduction server reads the second part of data from the external storage area is similar to the process in which the reduction server reads the first data from the external storage area. Reference may be made to the related description.

In a specific embodiment of this application, the operation of storing, by the memory management apparatus, the first target data from the first memory to the external storage area and the operation of storing, by the mapping server, data into the first memory may be performed in parallel. The operation of storing, by the memory management apparatus, the first target data from the first memory to the external storage area and the operation of reading, by the reduction server, data from the global memory may be performed in parallel. The operation of storing, by the memory management apparatus, the second target data from the external storage area into the first memory and the operation of storing, by the mapping server, data into the first memory may be performed in parallel. The operation of storing, by the memory management apparatus, the second target data from the external storage area into the first memory and the operation of reading, by the reduction server, data from the global memory may also be performed concurrently. As a result, data processing efficiency is improved.

In a specific implementation, the memory management apparatus may store the first target data from the first memory to the external storage area in an asynchronous or synchronous transmission manner. Alternatively, the memory management apparatus may store the second target data from the external storage area to the first memory.

Figure 8:
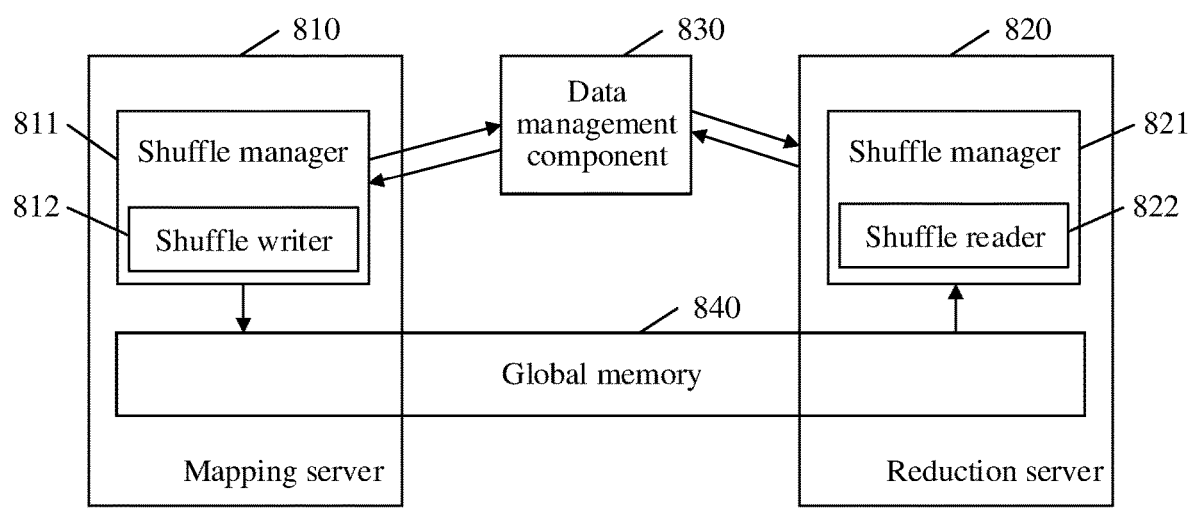
FIG. 8 is a schematic diagram of a software architecture of a method for processing data according to an embodiment of this application.

FIG. 8 is a schematic diagram of a software architecture of a method for processing data according to an embodiment of this application. As shown in FIG. 8, the method for processing data may be applied to a shuffle phase of a distributed processing system. The method may be implemented by using shuffle managers (shuffle manager) 811 and 812, a shuffle writer (shuffle writer) 812, a shuffle reader (shuffle reader) 822, a data management component (shuffle) 830, and a global memory 840.

The shuffle manager may provide an external shuffle function interface (for example, a global memory interface related to reading/writing, or an interface related to another operation of the global memory, such as an interface for storing a first target data from a first memory into an external storage area), and upper-layer software may use the external shuffle function interface after registration. The shuffle manager can be seamlessly compatible with a lot of open source software through a plugin (plugin).

Refer to FIG. 8. The shuffle manager 811 is deployed on a mapping server 810 in the distributed processing system. The shuffle writer (shuffle writer) 812, for example, a maptask (maptask), may write data to be written (for example, a processing result of the maptask) into the global memory 840 through a function interface provided by the shuffle manager 811 and by using memory semantic-based operation instructions.

The shuffle manager 821 is deployed on a reduction server 820 in the distributed processing system. The shuffle reader (shuffle reader) 822, for example, input data of a reducetask may be read, by using the reducetask (reducetask) and by using memory semantic-based operation instructions, from the global memory 840 through a function interface provided by the shuffle manager 821.

The data management component 830 interacts with both the shuffle manager 811 deployed on the mapping server 810 and the shuffle manager 821 deployed on the reduction server 820 in the distributed processing system. The data management component 830 manages intermediate data/ temporary data and provides a metadata service. For example, the data management component 830 may provide a metadata writing service for the shuffle manager 811 deployed on the mapping server 810. The data management component 830 may provide a metadata reading service for the shuffle manager 821 deployed on the reduction server 820.

The shuffle writer 812 is configured to perform a memory operation related to writing data to the global memory 840. For example, the memory semantic-based operation instructions such as memory application (for example, an allocate (size) instruction), address mapping (for example, a map instruction), unmapping (for example, an unmap instruction), memory release (for example, a release instruction), and data writing (for example, a store instruction) may be executed.

The shuffle reader 822 is used to perform a memory operation related to reading data from the global memory 840. For example, the memory semantic-based operation instructions such as memory application (for example, an allocate (size) instruction), address mapping (for example, a map instruction), unmapping (for example, an unmap instruction), memory release (for example, a release instruction), and data reading (for example, a load instruction), and memory semantics related to global memory copy may be executed.

It should be noted that the software architecture of the method for processing data in this embodiment of this application is described above by using only one mapping server and one reduction server as an example. The plurality of mapping servers and reduction servers in the distributed processing system may all use the software architecture shown in FIG. 8.

In a possible implementation, the software architecture may be implemented by using a plurality of programming languages such as Java, C++, and Python. This is not limited in this application. Optionally, when the software architecture is implemented by using Java, the components (including the shuffle managers 811 and 821, the shuffle writer 812, the shuffle reader 822, and the data management component 830) may all run on a Java virtual machine (Java Virtual Machine, JVM).

In a possible implementation, when the method for processing data in this embodiment of this application is implemented through the software architecture, second storage space may be applied for, in an initialization phase of a first operation process of the mapping server, to the global memory based on a preset first size, to store a processing result of the mapping server, that is, to store the intermediate data in the shuffle phase. The first operation process is used to execute a data processing task on the mapping server, and may include a plurality of maptask threads.

Optionally, the mapping server may include at least one first operator for processing the input data. In the initialization phase of the first operation process, the mapping server may apply to the global memory for a second storage area based on the preset first size and a quantity of processor cores of the mapping server, so that each processor core corresponds to one second storage area, where at least one first operator runs on each processor core.

Figure 9:
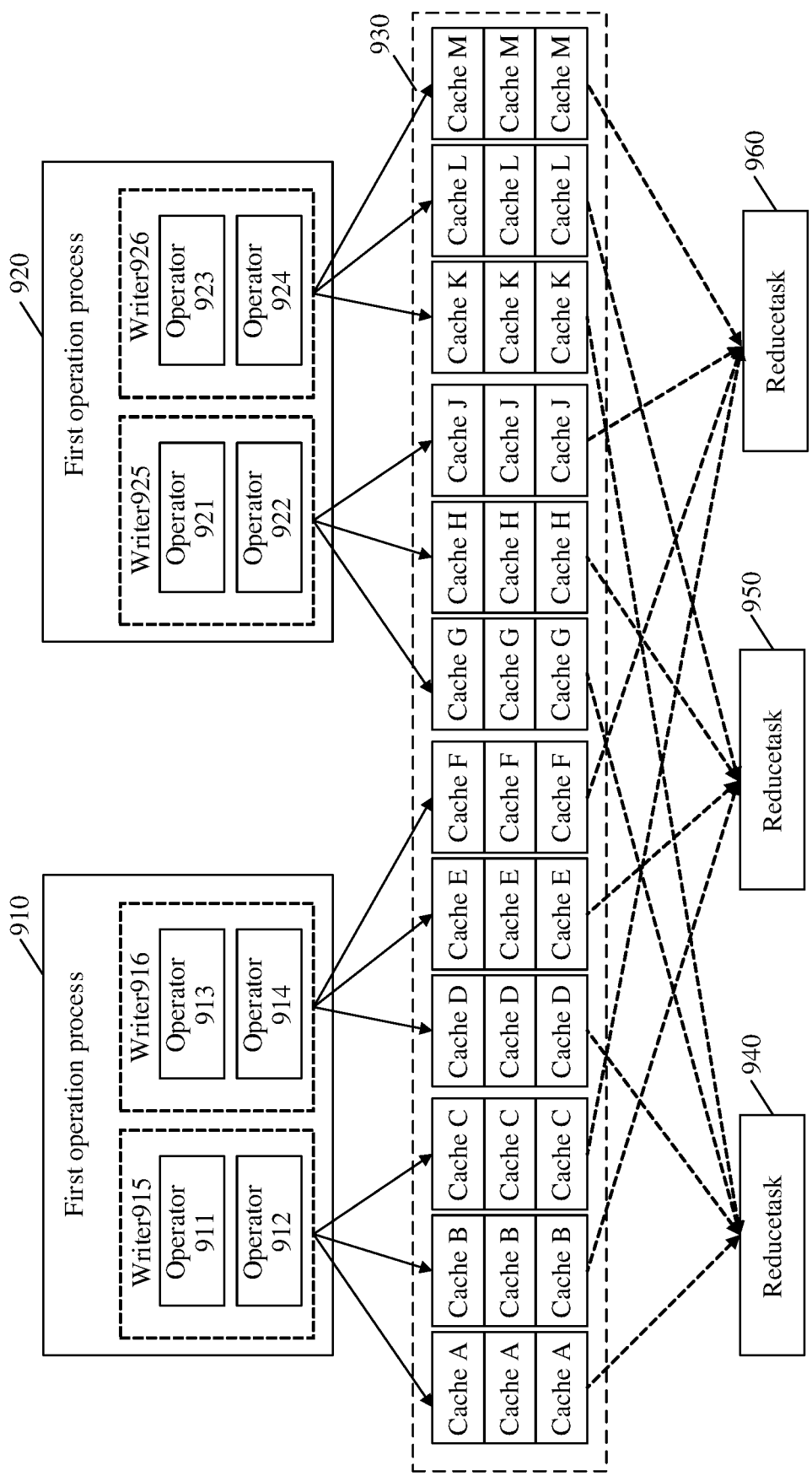
FIG. 9 is a schematic diagram of initialization of an operation process of a mapping server according to an embodiment of this application.

FIG. 9 is a schematic diagram of initialization of a first operation process of a mapping server according to an embodiment of this application. As shown in FIG. 9, a first operation process 910 and a first operation process 920 run on different mapping servers. A processor of each mapping server includes two CPU cores (CPU core).

The first operation process 910 includes four operators: an operator 911, an operator 912, an operator 913, and an operator 914. The operator 911, the operator 912, the operator 913, and the operator 914 are all first operators (namely, maptasks) that run on the mapping server and that are configured to process input data. The operator 911 and the operator 912 run on one kernel of the processor in a concurrent manner, and the operator 913 and the operator 914 run on another kernel of the processor in a concurrent manner.

The first operation process 920 includes four operators: an operator 921, an operator 922, an operator 923, and an operator 924. The operator 921, the operator 922, the operator 923, and the operator 924 are all first operators (namely, maptasks) that run on the mapping server and that are configured to process input data. The operator 921 and the operator 922 run on one kernel of the processor in a concurrent manner, and the operator 923 and the operator 924 run on another kernel of the processor in a concurrent manner.

During initialization of the first operation process 910 and the first operation process 920, the storage space (used to store the processing result of the mapping server) may be applied for, based on the preset first size and the quantity of the processor cores of the mapping server, to the global memory 930 to serve as the second storage area, so that each processor core corresponds to one second storage area. At least one first operator runs on each processor core of the mapping server.

To be specific, at least one operator that runs on a same processor core may be considered as a shuffle writer (shuffle writer), that is, each processor core corresponds to one shuffle writer. In addition, storage space is applied for to the global memory 930 for each shuffle writer based on the preset first size, and is used as a second storage area corresponding to each processor core (or each shuffle writer).

Refer to FIG. 9. The first operation process 910 considers the operator 911 and the operator 912 that run on a same processor core as a shuffle writer writer 915, and considers the operator 913 and the operator 914 that run on a same processor core as a shuffle writer writer 916.

The second storage area applied for by using the first operation process 910 in the global memory 930 for the writer 915 includes nine caches, which are respectively three caches A, three caches B, and three caches C. The cache A is configured to store data whose label is key1 in the processing results of the operator 911 and the operator 912, that is, aggregate the data whose label is key1 in the processing results of the operator 911 and the operator 912. The cache B is configured to store data whose label is key2 in the processing results of the operator 911 and the operator 912, that is, aggregate the data whose label is key2 in the processing results of the operator 911 and the operator 912. The cache C is configured to store data whose label is key3 in the processing results of the operator 911 and the operator 912, that is, aggregate the data whose label is key3 in the processing results of the operator 911 and the operator 912.

The second storage area applied for by using the first operation process 910 in the global memory 930 for the writer 916 includes nine caches, which are respectively three caches D, three caches E, and three caches F. The cache D is configured to store data whose label is key1 in the processing results of the operator 913 and the operator 914, that is, aggregate the data whose label is key1 in the processing results of the operator 913 and the operator 914. The cache E is configured to store data whose label is key2 in the processing results of the operator 913 and the operator 914, that is, aggregate the data whose label is key2 in the processing results of the operator 913 and the operator 914. The cache F is configured to store data whose label is key3 in the processing results of the operator 913 and the operator 914, that is, aggregate the data whose label is key3 in the processing results of the operator 913 and the operator 914.

Similarly, corresponding to the processor core, the first operation process 920 considers the operator 921 and the operator 922 that run on a same processor core as a shuffle writer writer 925, and considers the operator 923 and the operator 924 that run on a same processor core as a shuffle writer writer 926.

The second storage area applied for by using the first operation process 920 in the global memory 930 for the writer 925 includes nine caches, which are respectively three caches G, three caches H, and three caches J. The cache G is configured to store data whose label is key1 in the processing results of the operator 921 and the operator 922, that is, aggregate the data whose label is key1 in the processing results of the operator 921 and the operator 922. The cache H is configured to store data whose label is key2 in the processing results of the operator 921 and the operator 922, that is, aggregate the data whose label is key3 in the processing results of the operator 921 and the operator 922. The cache J is configured to store data whose label is key3 in the processing results of the operator 921 and the operator 922, that is, aggregate the data whose label is key3 in the processing results of the operator 921 and the operator 922.

The second storage area applied for by using the first operation process 920 in the global memory 930 for the writer 926 includes nine caches, which are respectively three caches K, three caches L, and three caches M. The cache K is configured to store data whose label is key1 in the processing results of the operator 923 and the operator 924, that is, aggregate the data whose label is key1 in the processing results of the operator 923 and the operator 924. The cache L is configured to store data whose label is key2 in the processing results of the operator 923 and the operator 924, that is, aggregate the data whose label is key2 in the processing results of the operator 923 and the operator 924. The cache M is configured to store data whose label is key3 in the processing results of the operator 923 and the operator 924, that is, aggregate the data whose label is key3 in the processing results of the operator 923 and the operator 924.

After processing in the first operation process 910 and the first operation process 920 is completed, data is read from the global memory 930 by using a reducetask (reducetask) 940, a reducetask (reducetask) 950, and a reducetask (reducetask) 960 that run on the reduction server separately.

Specifically, data whose label is key1 is read from the global memory 930 by using the reducetask (reducetask) 940, that is, the data is separately read from the cache A, the cache D, the cache G, and the cache K. Data whose label is key2 is read from the global memory 930 by using the reducetask (reducetask) 950, that is, the data is separately read from the cache B, the cache E, the cache H, and the cache L. Data whose label is key3 is read by using the reducetask (reducetask) 960 from the global memory 930, that is, the data is separately read from the cache C, the cache F, the cache J, and the cache M.

It should be noted that the initialization of the first operation process of the mapping server in this embodiment of this application is described above by using only two mapping servers as an example. Another mapping server in the distributed processing system is also initialized in a similar manner.

In this way, the second storage area is applied for, in the initialization phase of the first operation process on the mapping server, to the global memory based on the quantity of the processor cores of the mapping server, so that each processor core corresponds to one second storage area, where at least one first operator runs on each processor core. Therefore, at least one operator (for example, the operator 911 and the operator 912) that runs on a same processor core can be considered as a shuffle writer, and storage space is allocated to the shuffle writer in the global memory. In this way, data with a same label in the processing result of the at least one operator that runs on the same processor core is stored in a same area of the global memory, so that data aggregation based on the processor core is implemented, data decentralization is reduced, and data reading efficiency is improved.

Figure 10:
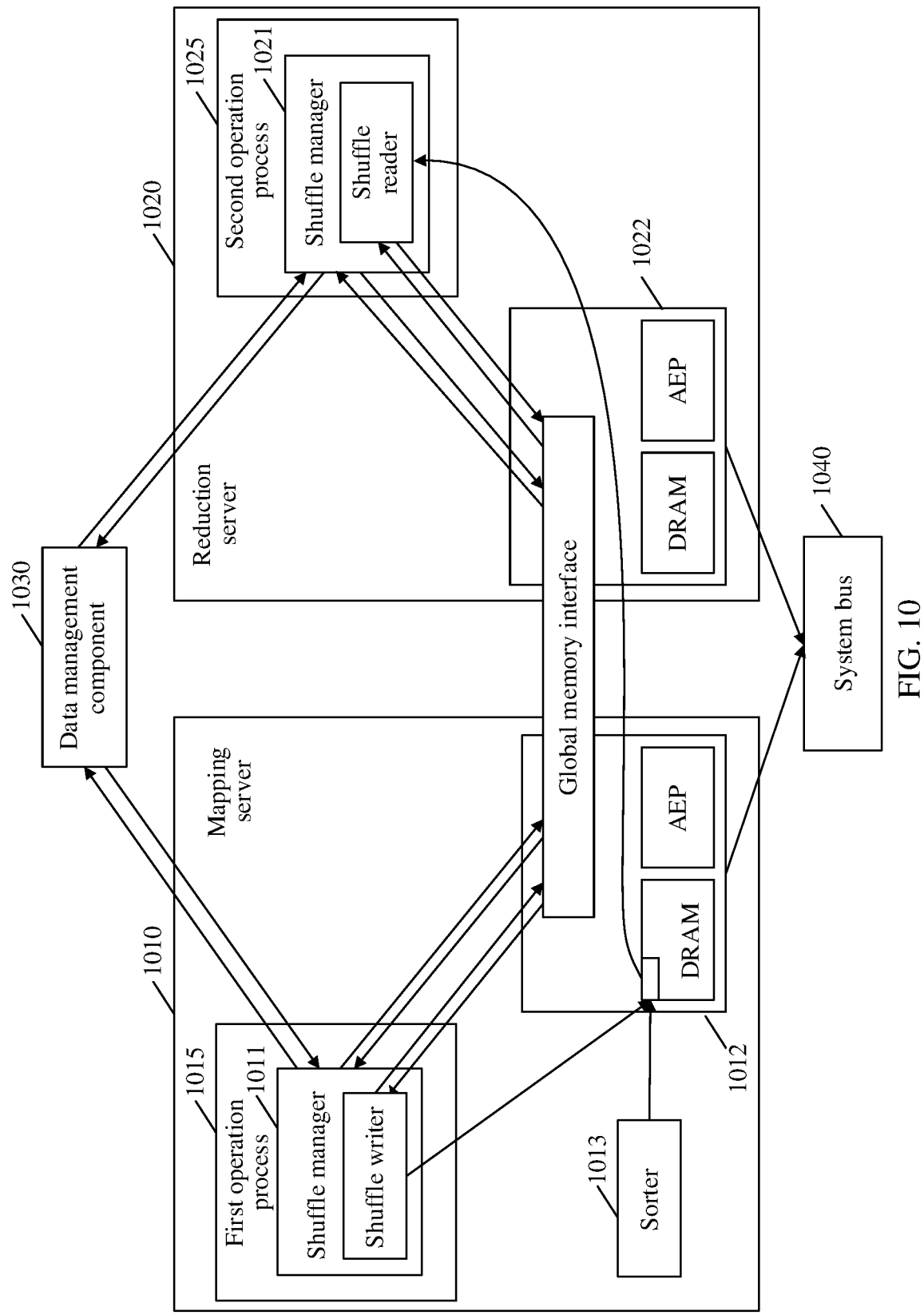
FIG. 10 is a schematic diagram of a processing process of a method for processing data according to an embodiment of this application.

FIG. 10 is a schematic diagram of a processing process of a method for processing data according to an embodiment of this application. As shown in FIG. 10, a distributed processing system includes a mapping server 1010 and a reduction server 1020. A multi-level memory 1012 of the mapping server 1010 includes DRAM+AEP, a multi-level memory 1022 of the reduction server 1020 also includes DRAM+AEP, and the multi-level memory 1012 and the multi-level memory 1022 are connected through a system bus 1040. After the mapping server 1010 and the reduction server 1020 are registered by using a preset register command, the multi-level memory 1012 and the multi-level memory 1022 form the global memory.

A first operation process 1015 on the mapping server 1010 is used to process input data. The first operation process 1015 may include a plurality of threads (threads corresponding to first operators) used to execute maptasks, namely, maptask threads. After the mapping server 1010 registers with a shuffle manager 1011 deployed on the mapping server 1010 in the first operation process 1015, a maptask thread, serving as a shuffle writer, may be used to write data to be written into the global memory through a function interface provided by the shuffle manager 1011.

In an initialization phase of the first operation process 1015, in the first operation process 1015, storage space (which may also be referred to as memory space, cache space, or the like) may be applied for based on a preset first size in a manner shown in FIG. 9 to the global memory, and the storage space is used as the second storage area. After the initialization is completed, the plurality of maptask threads in the first operation process 1015 may be used to process the input data to obtain second data (namely, a processing result of the mapping server 1010), for example, a plurality of <key, value> records. In the first operation process 1015, whether the storage space applied for in the initialization phase is an abundant supply may be determined based on a size of the second data. When the storage space applied for in the initialization phase is insufficient, in the first operation process 1015, storage space may further be dynamically applied for to the global memory through a global memory interface, and the newly applied storage space is mapped to an access range, so that the storage space can be accessed by the first operation process 1015.

After obtaining second data, the maptask thread may partition the second data into a plurality of data blocks in a hash manner based on a preset label. In addition, the maptask thread, serving as the shuffle writer, is used to store the plurality of data blocks in the applied storage space (namely, the second storage area) through a function interface provided by the shuffle manager 1011 and by using memory operation instructions.

If the written data needs to be sorted, the sorting may be performed by using a sorter 1013 in an asynchronous pipeline (pipeline) manner (refer to FIG. 5) when the data is written. It is assumed that the plurality of data blocks are stored in a DRAM in the multi-level memory 1012 of the mapping server 1010. After the plurality of data blocks are stored, the stored metadata of the plurality of data blocks may be sent to the data management component 1030 in the first operation process 1015, so that the data management component 1030 stores the metadata.

The second operation process 1025 on the reduction server 1020 is used to read first data (a target data block in the plurality of data blocks of the second data) from processing results (namely, the second data) of the mapping server 1010 and another mapping server (not shown), and process the read first data. The second operation process 1025 may include a plurality of threads (threads corresponding to second operators) used to execute reducetasks, that is, reducetask threads. After the reduction server 1020 registers with a shuffle manager 1021 deployed on the mapping server 1020 in the second operation process 1025, a reducetask thread, serving as a shuffle reader, may be used to read data from the global memory through a function interface provided by the shuffle manager 1021 and by using memory operation instructions.

When reading the first data to be processed, each reduce-task thread in the second operation process 1025 may be used to obtain metadata of the first data from the data management component 1030, determine a storage address of the first data based on the metadata, and map the storage address to an access range of the second operation process 1025. In the second operation process 1025, a corresponding memory may be locally applied for, and then data stored in the DRAM in the multi-level memory 1012 of the mapping server 1010 is directly read based on the mapped storage address and by using a memory data read command (for example, a load command) to the local memory of the reduction server 1020 for processing.

Alternatively, in a possible implementation, memory copies (gather memory copy) may be asynchronously gathered in the second operation process 1025, to hard copy data scattered in different remote memories to the local memory at a time for subsequent processing.

In a possible implementation, a status of the first memory may be further monitored in the first operation process 1015.

If it is determined in the first operation process 1015 that the first memory meets a first condition, a first target data may be determined from data stored in the first memory, and the first target data may be stored into an external storage area through the function interface provided by the shuffle manager 1011. After the first target data is stored into the external storage area, metadata of the first target data and metadata of the remaining data in the data stored in the first memory except the first target data may be sent to the data management component 1030, so that the data management component 1030 stores the metadata of the data stored in the external storage area and the first memory.

If it is determined in the first operation process 1015 that the first memory meets a second condition, a second target data may be determined from data stored in the external storage area, and the second target data may be stored into the first memory through the functional interface provided by the shuffle manager 1011. After the second target data is stored into the first memory in the first operation process 1015, metadata of the second target data and metadata of the remaining data in the data stored in the external storage area except the second target data may be sent to the data management component 1030, so that the data management component 1030 stores the metadata of the data stored in the external storage area and the first memory.

It should be noted that the processing process of the method for processing data in this embodiment of this application is described above by using only one mapping server and one reduction server as an example. It should be understood that the distributed processing system may include a plurality of mapping servers and a plurality of reduction servers, and a processing process thereof is similar to this, and details are not described herein again.

In a possible implementation, compared with reading/writing a local memory, when a read/write command (for example, a load/store command) is directly executed on the remote memories in the global memory, relatively high overheads still exist. A sorting result of intermediate data in a shuffle phase may be obtained in advance, so that the data may be pre-accessed by constructing a memory address list (memory address list) or the like, thereby improving reading/writing efficiency of the remote memories.

The method for processing data described in this embodiment of this application is applied to the distributed processing system. Data reading/writing in the shuffle phase can be implemented through the memory operation based on the global memory formed by memory interconnection of the plurality of computing nodes in the distributed processing system. In this way, massive memories can be fully used. In addition, redundant data processing steps in an old software architecture can be removed, thereby greatly improving processing performance in the shuffle phase.

According to the method for processing data in this embodiment of this application, based on a new hardware topology of the memory interconnection, the software architecture in the shuffle phase is redefined. Therefore, storage of the intermediate data in the shuffle phase and reading/writing between the computing nodes are performed in an efficient memory operation, thereby reducing a processing procedure in the shuffle phase, and further reducing a bottleneck effect of the shuffle phase in big data processing.

Figure 11:
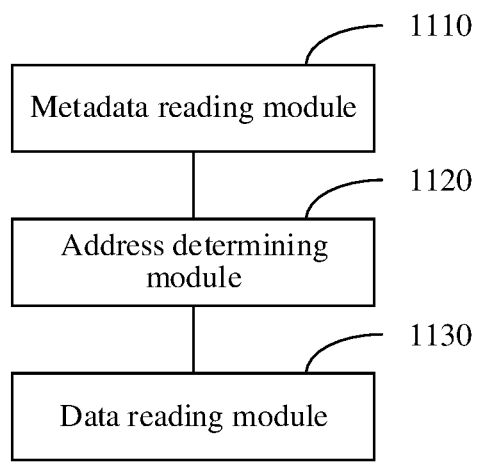
FIG. 11 is a block diagram of a reduction server according to an embodiment of this application.

FIG. 11 is a block diagram of a reduction server according to an embodiment of this application. The reduction server is used in a distributed processing system, the distributed processing system includes a plurality of mapping servers and a plurality of reduction servers, and memories of the plurality of mapping servers and memories of the plurality of reduction servers form a global memory.

As shown in FIG. 11, the reduction server includes:

a metadata reading module 1110, configured to obtain, from a preset first storage area, metadata of first data to be read, where for specific implementations of a function of the metadata reading module 1110, refer to step S601, and details are not described herein again;

an address determining module 1120, configured to determine a first address of the first data in the global memory based on the metadata, where for specific implementations of a function of the address determining module 1120, refer to step S602, and details are not described herein again; and a data reading module 1130, configured to read the first data from the global memory based on the first address, where the first data includes a target data block in a plurality of data blocks of second data, and the second data includes a processing result of a corresponding mapping server for input data, and for specific implementations of a function of the data reading module 1130, refer to step S603, and details are not described herein again.

In a possible implementation, the data reading module 1130 is configured to: map the first address to a second address when the first address is outside an access range of the reduction server, where the second address is within the access range of the reduction server; and read the first data from the global memory based on the second address.

In a possible implementation, the reduction server further includes: a first registration module, configured to perform, by the reduction server, registration by using a preset register instruction after the reduction server is connected to the distributed processing system, so that the memory of the reduction server is added to the global memory.

Figure 12:
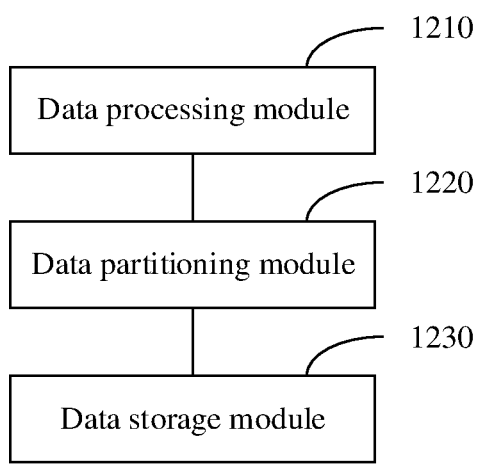
FIG. 12 is a block diagram of a mapping server according to an embodiment of this application.

FIG. 12 is a block diagram of a mapping server according to an embodiment of this application. The mapping server is used in a distributed processing system, the distributed processing system includes a plurality of mapping servers and a plurality of reduction servers, and memories of the plurality of mapping servers and memories of the plurality of reduction servers form a global memory.

As shown in FIG. 12, the mapping server includes:

a data processing module 1210, configured to process input data to obtain second data, where for specific implementations of a function of the data processing module 1210, reference may be made to step S4.1, and details are not described herein again;

a data partitioning module 1220, configured to partition the second data into a plurality of data blocks based on a preset label, where for specific implementations of a function of the data partitioning module 1220, reference may be made to step S402, and details are not described herein again; and a data storage module 1230, configured to store the plurality of data blocks into a second storage area, where the second storage area is located in the global memory, and for specific implementations of a function of the data storage module 1230, reference may be made to step S403, and details are not described herein again.

In a possible implementation, the data storage module 1230 is configured to: partition, when data in the plurality of data blocks needs to be sorted, the second storage area into a plurality of sub-areas based on a preset second size; store the plurality of data blocks into the plurality of sub-areas according to a sequence of the sub-areas; and sort, when the plurality of data blocks are stored into the plurality of sub-areas in sequence, data in all the sub-areas in which storage has been performed by updating an ordered index linked list, where the ordered index linked list is sorted by linking a location index of data by using a linked list.

In a possible implementation, the mapping server further includes: an initialization module, configured to apply, in an initialization phase of a first operation process, to the global memory for the second storage area based on a quantity of processor cores of the mapping server, so that each processor core corresponds to one second storage area, where the first operation process runs on the mapping server and is used to process the input data, at least one first operator runs on each processor core, and the first operator is configured to process the input data.

In a possible implementation, the data partitioning module 1220 is configured to partition, in a hash manner, the second data into a plurality of data blocks based on the preset label.

In a possible implementation, the data storage module 1230 is configured to: determine a third address of the second storage area; map the third address to a fourth address when the third address is outside an access range of the mapping server, where the fourth address is within the access range of the mapping server; and store the plurality of data blocks into the second storage area based on the fourth address.

In a possible implementation, the mapping server further includes: a metadata determining module, configured to determine metadata of the plurality of data blocks; and a metadata storage module, configured to store the metadata of the plurality of data blocks into a preset first storage area.

In a possible implementation, the mapping server further includes: a second registering module, configured to perform, by the mapping server, registration by using a preset register instruction after the mapping server is connected to the distributed processing system, so that the memory of the mapping server is added to the global memory.

In a possible implementation, the mapping server further includes: a memory management apparatus, configured to determine, when a first memory meets a first condition, first target data from data stored in the first memory, and store the first target data into an external storage area, where the first condition is that used space of the first memory is greater than or equal to a first threshold, or a ratio of the used space of the first memory to total space of the first memory is greater than or equal to a second threshold, and the first memory is the global memory or a part of the global memory.

In a possible implementation, the memory management apparatus is further configured to: determine, when the first memory meets a second condition, second target data from data stored in the external storage area, and store the second target data in the first memory, where the second condition is that the used space of the first memory is less than or equal to a third threshold, or the ratio of the used space of the first memory to the total space of the first memory is less than or equal to a fourth threshold.

In a possible implementation, the external storage area includes but is not limited to at least one of the following: an HDD and an SSD.

An embodiment of this application provides an apparatus for processing data, including a processor and a memory configured to store instructions executable by the processor. When executing the instructions, the processor is configured to implement the foregoing method.

An embodiment of this application provides a non-volatile computer-readable storage medium. The non-volatile computer-readable storage medium stores computer program instructions. When the computer program instructions are executed by a processor, the foregoing method is implemented.

An embodiment of this application provides a computer program product, including computer-readable code or a non-volatile computer-readable storage medium carrying computer-readable code. When the computer-readable code runs in a processor of an electronic device, a processor in the electronic device performs the foregoing method.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. More specific examples (non-exhaustive list) of the computer-readable storage medium include: a portable computer disk, a hard disk, a random-access memory (Random-Access Memory, RAM), a read-only memory (Read-Only Memory, ROM), an erasable programmable read-only memory (Electrically Programmable Read-Only Memory, EPROM, or flash memory), a static random-access memory (Static Random-Access Memory, SRAM), a portable compact disk read-only memory (Compact Disc Read-Only Memory, CD-ROM), a digital video disk (Digital Video Disc, DVD), a memory stick, a floppy disk, a mechanical coding device, for example, a punching card or a groove protrusion structure that stores instructions, and any suitable combination thereof.

Computer-readable program instructions or code described herein can be downloaded to respective computing/processing devices from a computer-readable storage medium, or downloaded to an external computer or external storage device via a network, such as the Internet, a local area network, a wide area network and/or a wireless network. The network may include a copper transmission cable, optical fiber transmission, wireless transmission, a router, a firewall, a switch, a gateway computer and/or an edge server. A network adapter card or network interface in each computing/processing device receives the computer-readable program instructions from the network and forwards the computer-readable program instructions for storage in a computer-readable storage medium in each computing/processing device.

The computer program instructions used to perform the operations in this application may be assembly instructions, instruction set architecture (Instruction Set Architecture, ISA) instructions, machine instructions, machine-related instructions, microcode, firmware instructions, status setting data, or source code or object code written in any combination of one or more programming languages. The programming languages include an object-oriented programming language such as Smalltalk and C++, and a conventional procedural programming language such as a "C" language or a similar programming language. The computer-readable program instructions may be executed entirely on a user computer, partly on the user computer, as a stand-alone software package, partly on the user computer and partly on a remote computer, or entirely on the remote computer or a server. In a case involving a remote computer, the remote computer may be connected to a user computer over any kind of network, including a local area network (Local Area Network, LAN) or a wide area network (Wide Area Network, WAN), or may be connected to an external computer (for example, connected over Internet using an Internet service provider). In some embodiments, an electronic circuit, for example, a programmable logic circuit, a field-programmable gate array (Field-Programmable Gate Array, FPGA), or a programmable logic array (Programmable Logic Array, PLA), is customized by using status information of computer-readable program instructions. The electronic circuit may execute the computer-readable program instructions, to implement various aspects of this application.

The various aspects of this application are described herein with reference to the flowcharts and/or block diagrams of the method, the apparatus (system), and the computer program product according to embodiments of this application. It should be understood that each block of the flowcharts and/or block diagrams and a combination of blocks in the flowcharts and/or block diagrams may be implemented by the computer-readable program instructions.

These computer-readable program instructions may be provided to a processor of a general-purpose computer, a dedicated computer, or another programmable data processing apparatus to produce a machine, so that the instructions, when executed by the processor of the computer or the another programmable data processing apparatus, create an apparatus for implementing functions/acts specified in one or more blocks in the flowcharts and/or block diagrams. These computer-readable program instructions may alternatively be stored in the computer-readable storage medium. These instructions enable a computer, a programmable data processing apparatus, and/or another device to work in a specific manner. Therefore, the computer-readable medium storing the instructions includes an artifact that includes instructions for implementing the various aspects of the functions/acts specified in the one or more blocks in the flowcharts and/or the block diagrams.

The computer-readable program instructions may alternatively be loaded onto a computer, another programmable data processing apparatus, or another device so that a series of operation steps is performed on the computer, the another programmable data processing apparatus, or the another device to produce a computer-implemented process. Therefore, the instructions executed on the computer, the another programmable data processing apparatus, or the another device implements the functions/acts specified in the one or more blocks in the flowcharts and/or block diagrams.

The flowcharts and block diagrams in the accompanying drawings show possible implementations of system architectures, functions, and operations of apparatuses, systems, methods, and computer program products according to a plurality of embodiments of this application. In this regard, each block in the flowcharts or block diagrams may represent a module, a program segment, or a part of the instructions, and the module, the program segment, or the part of the instructions includes one or more executable instructions for implementing a specified logical function. In some alternative implementations, a function marked in the block may also occur in a sequence different from that marked in the accompanying drawings. For example, two consecutive blocks may actually be executed substantially in parallel, and may sometimes be executed in a reverse order, depending on a function involved.

It should also be noted that each block in the block diagram and/or the flowchart, and a combination of blocks in the block diagram and/or the flowchart, may be implemented by hardware (for example, a circuit or an ASIC (Application-Specific Integrated Circuit, application-specific integrated circuit)) that performs a corresponding function or action, or may be implemented by a combination of hardware and software, for example, firmware.

Although the present invention is described with reference to embodiments, in a process of implementing the present invention that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

The foregoing has described embodiments of this application. The foregoing descriptions are examples, not exhaustive, and are not limited to the disclosed embodiments. Many modifications and changes are apparent to those of ordinary skill in the art without departing from the scope and spirit of the illustrated embodiments. The selection of terms used herein is intended to best explain the principles of embodiments, practical applications, or improvements to technologies in the market, or to enable another person of ordinary skill in the art to understand embodiments disclosed herein.

What is claimed is:

1. A method for processing data, comprising:
obtaining, by a reduction server of a plurality of reduction servers in a distributed processing system and from a first storage area, metadata of first data to be read, wherein the first data comprises a target data block in a plurality of data blocks of second data, and wherein the second data comprises a processing result of a mapping server of a plurality of mapping servers for input data, and the plurality of data blocks of the second data are generated based on operations comprising:
partitioning, by the mapping server in response to determining that data in the plurality of data blocks needs to be sorted, a second storage area in a global memory into a plurality of sub-areas based on a preset second size; and storing, by the mapping server, the plurality of data blocks into the plurality of sub-areas according to a sequence of the plurality of sub-areas;

determining, by the reduction server, a first address of the first data in the global memory based on the metadata, wherein the global memory comprises memories of the plurality of mapping servers and the plurality of reduction servers; and reading, by the reduction server, the first data from the global memory based on the first address.

2. The method according to claim 1, wherein the reading the first data from the global memory based on the first address comprises:

mapping, by the reduction server, the first address to a second address, wherein the first address is outside an access range of the reduction server and the second address is within the access range of the reduction server; and reading, by the reduction server, the first data from the global memory based on the second address.

3. The method according to claim 1, wherein the method further comprises:

performing, by the reduction server, registration to add a memory of the reduction server to the global memory, by using a preset register instruction after the reduction server is connected to the distributed processing system.

4. A method for processing data, comprising:

processing, by a mapping server of a plurality of mapping servers in a distributed processing system, input data to obtain second data;

partitioning, by the mapping server, the second data into a plurality of data blocks based on a preset label; and storing, by the mapping server, the plurality of data blocks into a second storage area in a global memory, comprising:

partitioning, by the mapping server in response to determining that data in the plurality of data blocks needs to be sorted, the second storage area into a plurality of sub-areas based on a preset second size; and storing, by the mapping server, the plurality of data blocks into the plurality of sub-areas according to a sequence of the plurality of sub-areas, wherein the global memory comprises memories of the plurality of mapping servers and a plurality of reduction servers.

5. The method according to claim 4, wherein the storing the plurality of data blocks into a second storage area further comprises:

sorting, by the mapping server in response to determining that the plurality of data blocks are stored into the plurality of sub-areas in sequence, data in the sub-areas in which storage has been performed by updating an ordered index linked list, wherein the ordered index linked list is sorted by linking a location index of data by using a linked list.

6. The method according to claim 4, wherein the mapping server comprises at least one first operator that processes the input data, and wherein the method further comprises:

applying, in an initialization phase of a first operation process performed on the mapping server, to the global memory for the second storage area based on a quantity of processor cores of the mapping server, so that each processor core corresponds to one second storage area, wherein at least one first operator runs on each processor core.

7. The method according to claim 4, wherein the partitioning the second data into a plurality of data blocks based on a preset label comprises:

partitioning, by the mapping server based on a hash, the second data into a plurality of data blocks based on the preset label.

8. The method according to claim 4, wherein the storing the plurality of data blocks into a second storage area comprises:

determining, by the mapping server, a third address of the second storage area;

mapping, by the mapping server, the third address to a fourth address, wherein the third address is outside an access range of the mapping server and the fourth address is within the access range of the mapping server; and storing, by the mapping server, the plurality of data blocks into the second storage area based on the fourth address.

9. The method according to claim 4, wherein the method further comprises:

determining, by the mapping server, metadata of the plurality of data blocks; and storing, by the mapping server, the metadata of the plurality of data blocks into a first storage area.

10. The method according to claim 4, wherein the method further comprises:

performing, by the mapping server, registration by using a preset register instruction to add a memory of the mapping server to the global memory, after the mapping server is connected to the distributed processing system.

11. A distributed processing system, comprising a plurality of mapping servers and a plurality of reduction servers, and memories of the plurality of mapping servers and memories of the plurality of reduction servers form a global memory; wherein a reduction server of the plurality of reduction servers is configured to:

obtain, from a first storage area, metadata of first data to be read, wherein the first data comprises a target data block in a plurality of data blocks of second data, and wherein the second data comprises a processing result of a mapping server of a plurality of mapping servers for input data;

determine a first address of the first data in the global memory based on the metadata; and read the first data from the global memory based on the first address; and a mapping server of the plurality of mapping servers is configured to:

process input data to obtain the second data;

partition the second data into a plurality of data blocks based on a preset label; and store the plurality of data blocks into a second storage area in the global memory, wherein:

partition, in response to determining that data in the plurality of data blocks needs to be sorted, the second storage area into a plurality of sub-areas based on a preset second size; and store the plurality of data blocks into the plurality of sub-areas according to a sequence of the plurality of sub-areas.

12. The distributed processing system according to claim 11, wherein the reduction server is configured to:

map the first address to a second address, wherein the first address is outside an access range of the reduction server and the second address is within the access range of the reduction server; and read the first data from the global memory based on the second address.

13. The distributed processing system according to claim 11, wherein the reduction server is further configured to:

perform registration to add a memory of the reduction server to the global memory, by using a preset register instruction after the reduction server is connected to the distributed processing system.

14. The distributed processing system according to claim 13, wherein the mapping server is further configured to:

sort, in response to determining that the plurality of data blocks are stored into the plurality of sub-areas in sequence, data in the sub-areas in which storage has been performed by updating an ordered index linked list, wherein the ordered index linked list is sorted by linking a location index of data by using a linked list.

15. The distributed processing system according to claim 11, wherein the mapping server is further configured to:

apply, in an initialization phase of a first operation process performed on the mapping server, to the global memory for the second storage area based on a quantity of processor cores of the mapping server, so that each processor core corresponds to one second storage area, wherein at least one first operator runs on each processor core and the first operation process runs on the mapping server to process the input data.

16. The distributed processing system according to claim 14, wherein mapping server is configured to:

partition, based on a hash manner, the second data into a plurality of data blocks based on the preset label.

17. The distributed processing system according to claim 14, wherein the mapping server is configured to:

determine a third address of the second storage area;

map the third address to a fourth address, wherein the third address is outside an access range of the mapping server and the fourth address is within the access range of the mapping server; and store the plurality of data blocks into the second storage area based on the fourth address.

18. The distributed processing system according to claim 14, wherein the mapping server is further configured to:

determine metadata of the plurality of data blocks; and store the metadata of the plurality of data blocks into the first storage area.

19. The distributed processing system according to claim 14, wherein the mapping server is further configured to:

perform registration by using a preset register instruction to add a memory of the mapping server to the global memory, after the mapping server is connected to the distributed processing system.

20. The distributed processing system according to claim 14, wherein the mapping server is further configured to:

determine, in response to a first memory satisfies a first condition, first target data from data stored in the first memory; and store the first target data into an external storage area, wherein the first condition is that used space of the first memory is greater than or equal to a first threshold, or a ratio of the used space of the first memory to total space of the first memory is greater than or equal to a second threshold, and wherein the first memory is the global memory or a part of the global memory.

* * * * *